United States Patent
Zhou et al.

(10) Patent No.: US 11,844,120 B2
(45) Date of Patent: Dec. 12, 2023

(54) METHODS AND APPARATUS FOR DETERMINING PHYSICAL CELL IDENTIFICATION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/235,728

(22) Filed: Apr. 20, 2021

(65) Prior Publication Data
US 2021/0337606 A1 Oct. 28, 2021

Related U.S. Application Data

(60) Provisional application No. 63/014,041, filed on Apr. 22, 2020.

(51) Int. Cl.
*H04W 76/11* (2018.01)
*H04W 72/1263* (2023.01)
(Continued)

(52) U.S. Cl.
CPC ........ *H04W 76/11* (2018.02); *H04W 72/1263* (2013.01); *H04W 72/535* (2023.01); *H04W 76/15* (2018.02); *H04W 80/02* (2013.01)

(58) Field of Classification Search
CPC . H04W 76/11; H04W 76/15; H04W 72/1257; H04W 72/1263; H04W 80/02
(Continued)

(56) References Cited

U.S. PATENT DOCUMENTS

| 10,122,528 | B2* | 11/2018 | Lei ........................ H04J 11/0076 |
| 11,284,406 | B2* | 3/2022 | Ko ........................ H04W 72/541 |
| 2020/0029203 | A1* | 1/2020 | Ekpenyong ........... H04W 28/18 |

FOREIGN PATENT DOCUMENTS

| WO | 2013139042 A1 | 9/2013 |
| WO | 2020069415 A1 | 4/2020 |

(Continued)

OTHER PUBLICATIONS

R1-1903697, "LS on support of Enhancements on multi-TRP/panel transmission", 3GPP TSG RAN WG1 Meeting #96, Athens, Greece, Feb. 25-Mar. 1, 2019 (Year: 2019).*
(Continued)

*Primary Examiner* — Intekhaab A Siddiquee
(74) *Attorney, Agent, or Firm* — Arent Fox LLP/Qualcomm Incorporated

(57) ABSTRACT

Aspects of the present disclosure include methods, apparatuses, and computer readable media for receiving a layer 1 signaling or a layer 2 signaling indicating a subset of a plurality of physical cell identifications (PCIs) associated with a plurality of serving cells in the network, establishing a plurality of communication channels with one or more of transmission-reception points (TRPs), wherein each TRP of the one or more TRPs comprises a corresponding PCI of the plurality of PCIs, and determining one or more PCIs of the plurality of PCIs used as one or more default input cell identifications (IDs) associated with a plurality of physical processings, when no explicit configured input ID is signaled to the UE associated with the plurality of physical processings.

29 Claims, 7 Drawing Sheets

(51) Int. Cl.
*H04W 72/50* (2023.01)
*H04W 76/15* (2018.01)
*H04W 80/02* (2009.01)

(58) Field of Classification Search
USPC .......................................................... 370/329
See application file for complete search history.

(56) References Cited

FOREIGN PATENT DOCUMENTS

| WO | WO-2021064494 A1 * | 4/2021 | ............ H04W 24/08 |
| WO | WO-2021158087 A1 * | 8/2021 | ............... H04L 1/08 |

OTHER PUBLICATIONS

International Search Report and Written Opinion—PCT/US2021/028430—ISA/EPO—dated Jul. 6, 2021.

* cited by examiner

700

705

TRANSMITTING A LAYER 1 SIGNALING OR A LAYER 2 SIGNALING INDICATING A SELECTED SUBSET OF A PLURALITY OF PHYSICAL CELL IDENTIFICATIONS (PCIS) ASSOCIATED WITH A SELECTED SUBSET OF A PLURALITY OF TRANSMISSION-RECEPTION POINTS (TRPS) IN THE NETWORK, WHEREIN ONE OR MORE PCIS OF THE PLURALITY OF PCIS IS CONFIGURED FOR USE BY A USER EQUIPMENT (UE) AS ONE OR MORE DEFAULT INPUT CELL IDENTIFICATIONS (IDS) ASSOCIATED WITH A PLURALITY OF PHYSICAL PROCESSINGS, WHEN NO EXPLICIT CONFIGURED INPUT ID IS SIGNALED TO THE UE ASSOCIATED WITH THE PLURALITY OF PHYSICAL PROCESSINGS

710

ESTABLISHING A COMMUNICATION CHANNEL WITH THE UE, WHEREIN THE COMMUNICATION CHANNEL IS ONE OF THE PLURALITY OF COMMUNICATION CHANNELS BETWEEN THE UE AND THE SELECTED SUBSET OF THE PLURALITY OF TRPS, EACH TRP CORRESPONDING TO A PCI OF THE PLURALITY OF PCIS

METHODS AND APPARATUS FOR DETERMINING PHYSICAL CELL IDENTIFICATION

CROSS REFERENCE TO RELATED APPLICATIONS

The current application claims priority to and the benefit of U.S. Provisional Application No. 63/014,041 filed on Apr. 22, 2020, entitled "Methods and Apparatus for Determining Physical Cell Identification," the content of which is hereby incorporated by reference in its entirety.

BACKGROUND

Aspects of the present disclosure relate generally to wireless communications, and more particularly, to apparatuses and methods for determining physical cell identification (PCI) during wireless communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, one or more base stations (also known as transmission-reception points (TRPs)) may transmit and/or receive information to and/or from a user equipment (UE) via one or more communication channels. The one or more BSs and the UE may use a physical cell identification (PCI) during the communication session for bit scrambling, signal generation, or other tasks associated with wireless communications. However, when multiple TRPs are used to communicate with the UE, it is unclear which PCI to use. Therefore, improvements may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for receiving a layer 1 signaling or a layer 2 signaling indicating a selected subset of a plurality of physical cell identifications (PCIs) associated with a selected subset of a plurality of transmission-reception points (TRPs) in the network, establishing a plurality of communication channels with the subset of the plurality of TRPs, wherein each TRP comprises a corresponding PCI of the plurality of PCIs, and determining one or more PCIs of the plurality of PCIs used as one or more default input cell identifications (IDs) associated with a plurality of physical processings, when no explicit configured input ID is signaled to the UE associated with the plurality of physical processings.

Other aspects of the present disclosure include a user equipment (UE) having a memory comprising instructions, a transceiver, and one or more processors operatively coupled with the memory and the transceiver, the one or more processors configured to execute instructions in the memory to receive a layer 1 signaling or a layer 2 signaling indicating a selected subset of a plurality of physical cell identifications (PCIs) associated with a selected subset of a plurality of transmission-reception points (TRPs) in the network, establish a plurality of communication channels with the subset of the plurality of TRPs, wherein each TRP comprises a corresponding PCI of the plurality of PCIs, and determine one or more PCIs of the plurality of PCIs used as one or more default input cell identifications (IDs) associated with a plurality of physical processings, when no explicit configured input ID is signaled to the UE associated with the plurality of physical processings.

An aspect of the present disclosure includes a UE including means for receiving a layer 1 signaling or a layer 2 signaling indicating a selected subset of a plurality of physical cell identifications (PCIs) associated with a selected subset of a plurality of transmission-reception points (TRPs) in the network, means for establishing a plurality of communication channels with the subset of the plurality of TRPs, wherein each TRP comprises a corresponding PCI of the plurality of PCIs, and means for determining one or more PCIs of the plurality of PCIs used as one or more default input cell identifications (IDs) associated with a plurality of physical processings, when no explicit configured input ID is signaled to the UE associated with the plurality of physical processings.

Some aspects of the present disclosure include non-transitory computer readable media having instructions stored therein that, when executed by one or more processors of a UE, cause the one or more processors to receive a layer 1 signaling or a layer 2 signaling indicating a selected subset of a plurality of physical cell identifications (PCIs) associated with a selected subset of a plurality of transmission-reception points (TRPs) in the network, establish a plurality of communication channels with the subset of the plurality of TRPs, wherein each TRP comprises a corresponding PCI of the plurality of PCIs, and determine one or more PCIs of the plurality of PCIs used as one or more default input cell identifications (IDs) associated with a plurality of physical processings, when no explicit configured input ID is signaled to the UE associated with the plurality of physical processings.

Aspects of the present disclosure include methods for transmitting a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings and establishing a communication channel with the UE, wherein the communication channel is one of the plurality of communication channels between the UE and the selected subset of the plurality of TRPs, each TRP corresponding to a PCI of the plurality of PCIs.

Other aspects of the present disclosure include a (base station) BS having a memory comprising instructions, a transceiver, and one or more processors operatively coupled with the memory and the transceiver, the one or more processors configured to execute instructions in the memory to transmit a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings and establish a communication channel with the UE, wherein the communication channel is one of the plurality of communication channels between the UE and the selected subset of the plurality of TRPs, each TRP corresponding to a PCI of the plurality of PCIs.

An aspect of the present disclosure includes a BS including means for transmitting a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings and means for establishing a communication channel with the UE, wherein the communication channel is one of the plurality of communication channels between the UE and the selected subset of the plurality of TRPs, each TRP corresponding to a PCI of the plurality of PCIs.

Some aspects of the present disclosure include non-transitory computer readable media having instructions stored therein that, when executed by one or more processors of a BS, cause the one or more processors to transmit a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings and establish a communication channel with the UE, wherein the communication channel is one of the plurality of communication channels between the UE and the selected subset of the plurality of TRPs, each TRP corresponding to a PCI of the plurality of PCIs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 7 is a process flow diagram of an example of a method for transmitting an indication of a new PCI performed by a BS according to aspects of the present disclosure.

DETAILED DESCRIPTION

Figure 1:
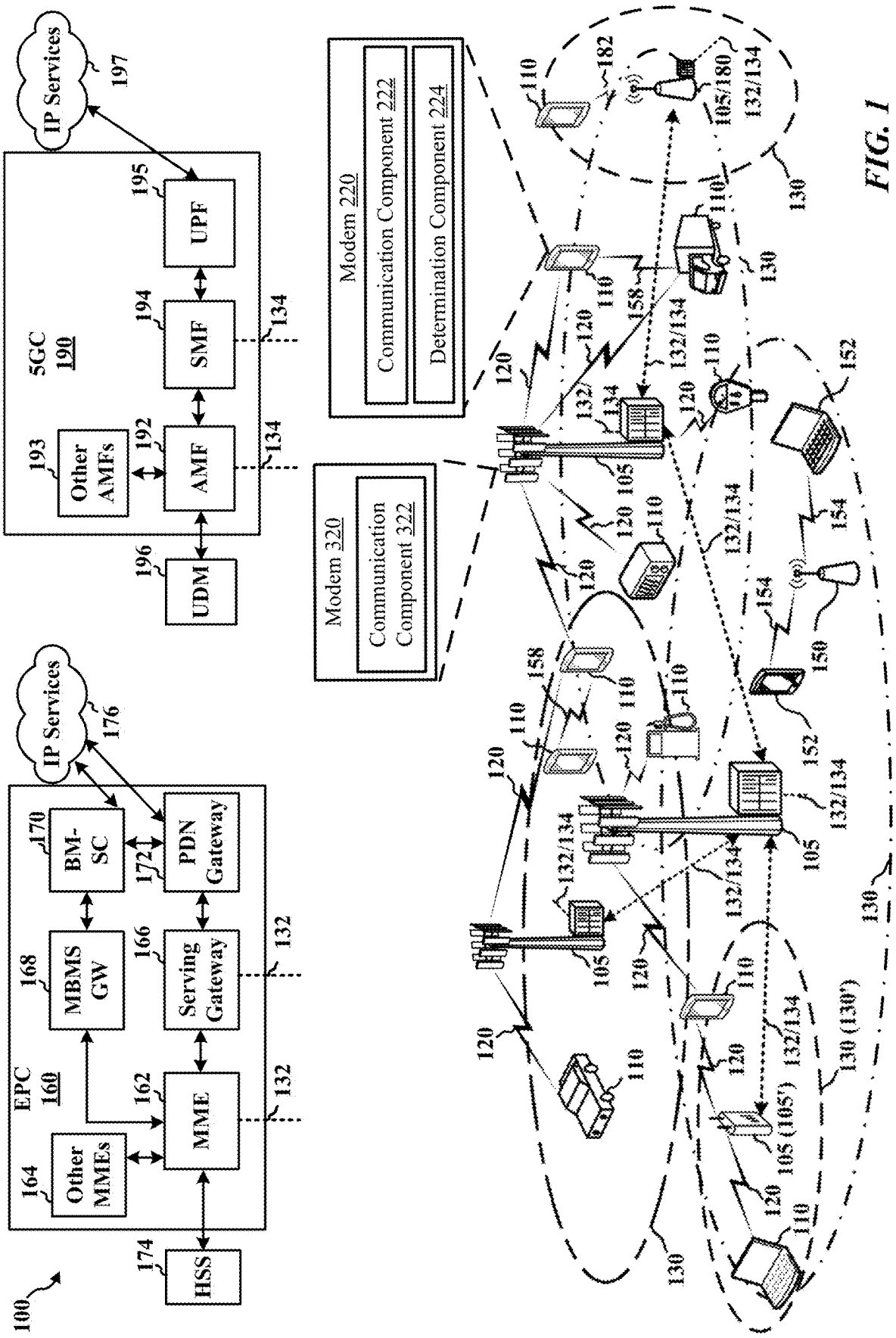
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one implementation, a serving cell may include one or more base stations (BSs) (e.g., transmission-reception points (TRPs)) for transmitting and/or receiving information to/from a user equipment (UE). The serving cell may have a physical cell identification (PCI) used by the TRPs and/or the UE for bit scrambling (e.g., physical broadcast channel (PBCH), physical downlink control channel (PDCCH), physical downlink shared channel (PDSCH), physical uplink control channel (PUCCH), physical uplink shared channel (PUSCH), etc.), time and/or frequency hopping pattern generations, demodulation reference signal sequence (DMRS) generations, and/or control resource set (CORESET) mapping.

For example, for PUSCH/PDSCH/PDCCH/PUCCH format 2, 3, 4, bits prior to modulation may be scrambled by the PCI if no scrambling ID is configured. Time/frequency hopping pattern of sequence properties for sequence carrying information/DMRS in PUCCH format 0,1,3,4 may be determined based on the PCI if no corresponding determination ID is configured. Sequence properties may include sequence group, sequence number, and cyclic shift. When transform precoding is disabled or enabled, DMRS sequence for PUSCH/PDSCH/PDCCH may be determined based on the PCI if no corresponding determination ID is configured. For interleaved control channel element (CCE) to resource element group (REG) mapping for a CORESET, the interleaving pattern may be a function of a parameter n_shift, which may be the PCI if no radio resource control (RRC) configured n_shift is provided. In one example, for CORESET 0 configured by ControlResourceSetZero information element, n_shift may be equal to the PCI. For PBCH, bits prior to modulation may be scrambled by the PCI, and DMRS may be determined based on the PCI.

In some instances, L1/L2 based inter-cell mobility may be implemented in a communication network. Each serving cell may have multiple TRPs, which may be at different locations, and each TRP may have a different PCI, e.g. carried by the synchronization signal block (SSB) transmitted from this TRP. At a given time, the UE may be served by a subset of the serving cells (e.g., PCIs of the subset of the serving cells), which may be changed from time to time via L1 or L2 signaling, such as downlink control indicator (DCI) and/or medium access control (MAC) control element (CE). In certain instances, the UE may be configured with a group of serving cells with a single PCI per serving cell, and may be configured to measure L1 metrics per serving cell in the group, e.g. L1-RSRP/SINR/RSRQ. At each time, the UE may be served by a subset of the group of serving cells, which may be changed from time to time via L1 or L2 signaling. The BS (e.g., gNB) may determine the subset based on L1 report from the UE either to some selected serving cells or to an anchor serving cell in the group.

In certain instances, the selected subset of PCI(s) to serve the UE may change fast via L1/L2 signaling. For physical (PHY) processing with PCI as input, the PCI(s) may be determined to be used as the default input when no explicit input ID is signaled to the UE.

In some aspects of the present disclosure, the network (BS and/or UE) may determine the input PCI(s) with the following options for PHY processing in L1/L2 inter-cell mobility, where the selected subset of PCI(s) to serve the UE may change fast via L1/L2 signaling. In a first example, one PCI may be used as input, regardless of which subset of PCIs are selected to serve the UE. This PCI may be associated with the whole cell group, and may or may not be one PCI for a particular cell in the group. This PCI may be either explicitly signaled to UE, or implicitly determined by a rule. In one example, this PCI may be an anchor cell in the group, which is configured for broadcast, random access, measurement report, or other control/management purpose. In another example, this PCI may be the lowest/highest one in the group. In another example, a PCI may be one of the selected PCIs. The PCI may be explicitly signaled to the UE, or implicitly determined by a rule, e.g. the lowest/highest one in the subset. In another example, the targeted PCI for the PHY processing may be used. If a PHY processing is associated with a targeted PCI, e.g. for UE Tx/Rx to/from a cell, then corresponding PCI is used as input.

In certain aspects, the PHY processing may include payload scrambling for downlink (DL) and/or uplink (UL) control/data channels, DMRS sequence determination for DL/UL control/data channels, time/frequency hopping pattern of sequence properties for information/DMRS sequence for DL/UL control/data channels, interleaved control channel element (CCE) to resource element group (REG) mapping pattern for a CORESET, and/or sequence determination for DL/UL reference signals for measurement, e.g. channel state indicator (CSI) reference signals (RS), sounding reference signals (SRS), positioning reference signals (PRS), etc. The determined PCI is used at least as default input when no explicit input ID is signaled to the UE.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 and/or a determination component 224. The communication component 222 and/or a modem 220 of the UE 110 may be configured to communicate with the BS 105 via a cellular network, a Wi-Fi network, or other wireless and wired networks. The UE 110 may include a determination component 224 for determining the PCIs for PHY processings. In some implementations, the BS 105 may include a communication component 322 configured to communicate with the UE 110.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
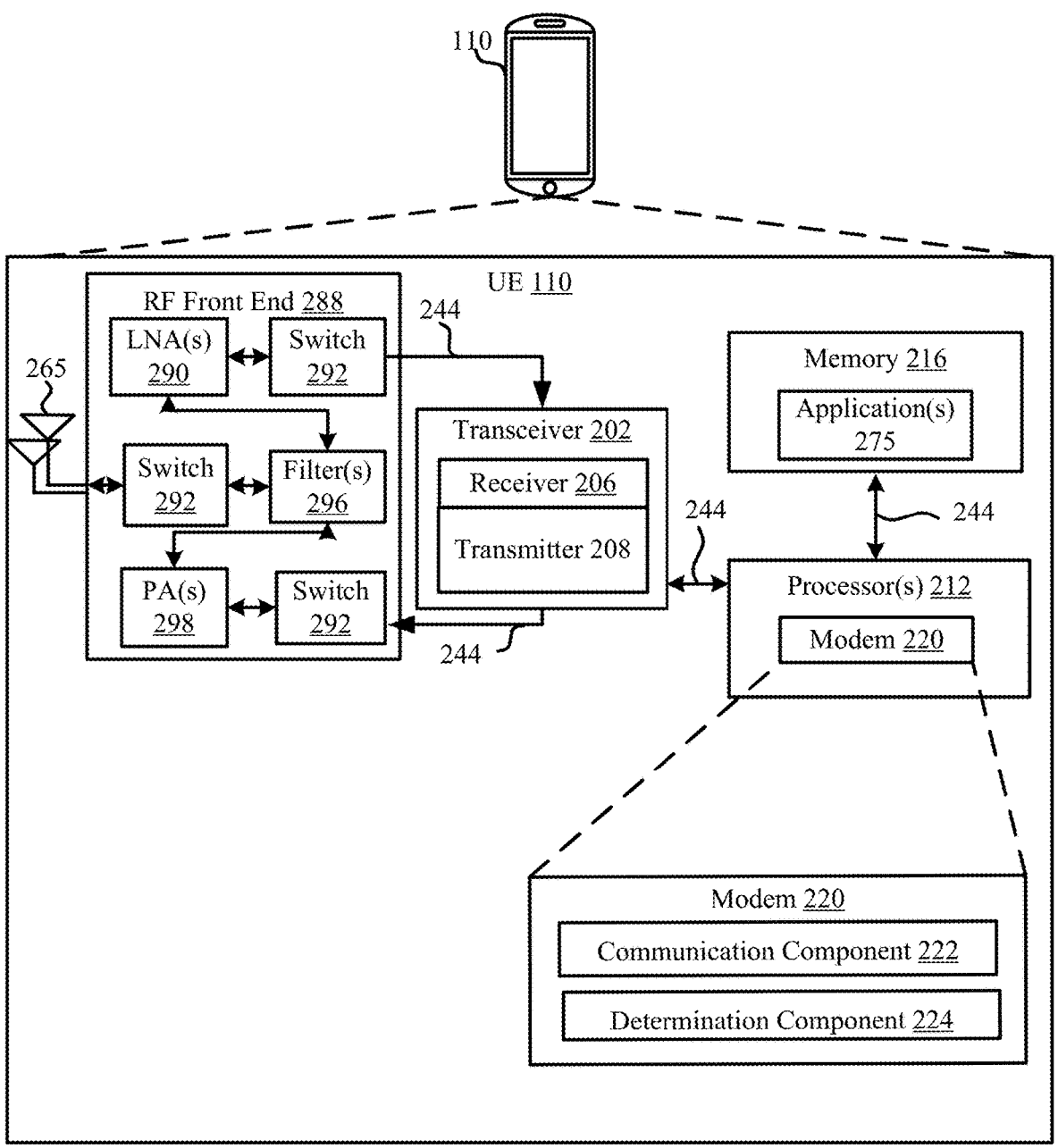
FIG. 2 is a schematic diagram of an example of a user equipment according to aspects of the present disclosure.

Referring to FIG. 2, one example of an implementation of the UE 110 may include a modem 220 having a communication component 222 and/or the determination component 224. The communication component 222 and/or the modem 220 of the UE 110 may be configured to communicate with the BS 105 via a cellular network, a Wi-Fi network, or other wireless and wired networks. The UE 110 may include a determination component 224 for determining the PCIs for PHY processings.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and/or the determination component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 and/or the determination component 224 may be performed by transceiver 202.

Also, memory 216 may be configured to store data used herein and/or local versions of applications 275 or the communication component 222, the determination component 224, and/or one or more subcomponents of the communication component 222 and/or the determination component 224 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the determination component 224, and/or one or more of the subcomponents, and/or data associated therewith, when UE 110 is operating at least one processor 212 to execute the communication component 222, the determination component 224, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
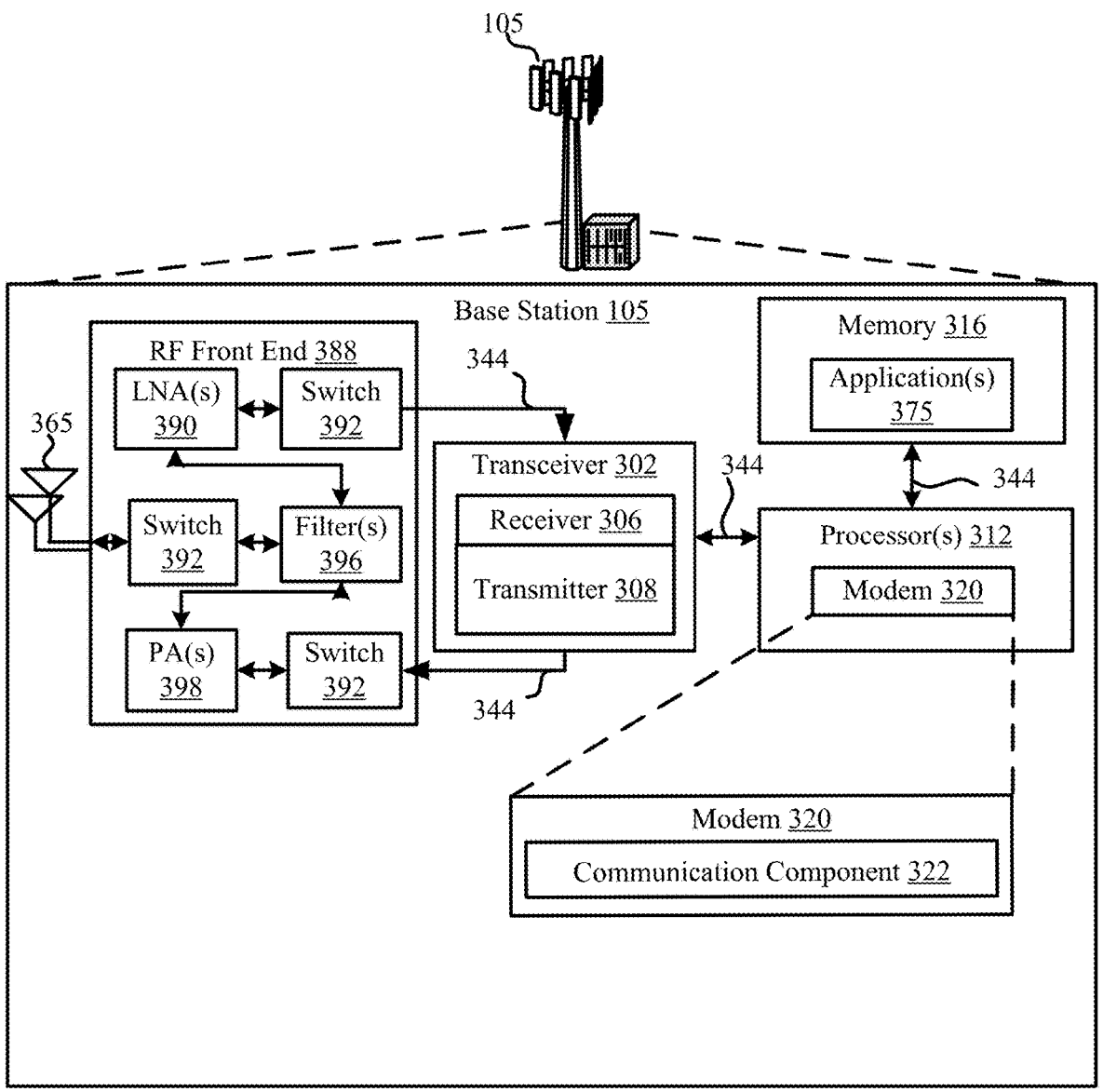
FIG. 3 is a schematic diagram of an example of a base station according to aspects of the present disclosure.

Referring to FIG. 3, one example of an implementation of the BS 105 may include a modem 320 with a communication component 322 configured to transmit data. The communication component 322 and/or the modem 320 the BS 105 may be configured to communicate with the UE 110 via a cellular network, a Wi-Fi network, or other wireless and wired networks.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322, the determination component, and/or one or more subcomponents of the communication component 322 or the determination component being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, the determination component, and/or one or more of its subcomponents, and/or data associated therewith, when the BS 105 is operating at least one processor 312 to execute the communication component 322, the determination component, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
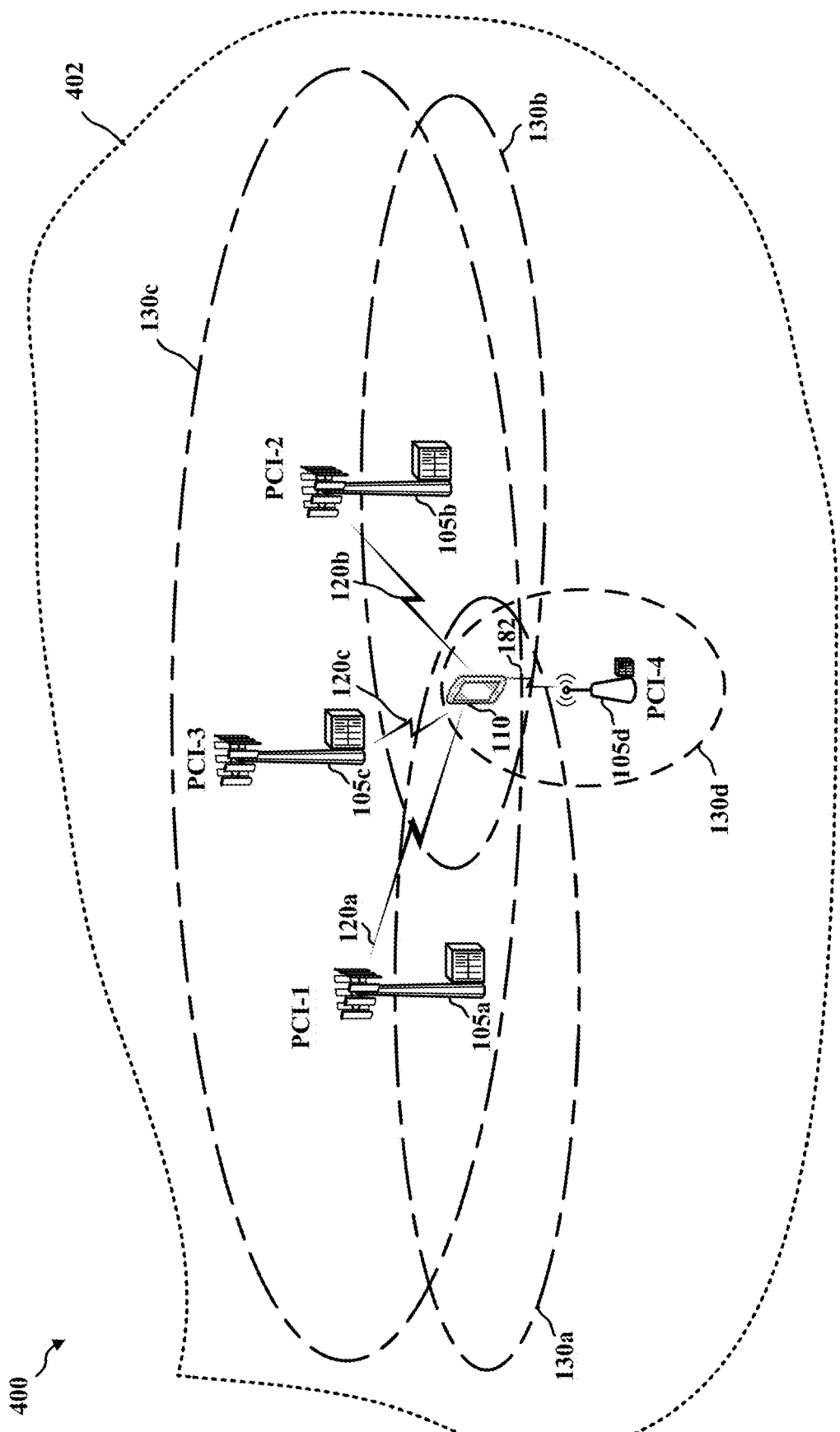
FIG. 4 is schematic diagram of a first example of a wireless communication network having multiple cells for communicating with the UE according to aspects of the present disclosure.

Turning to FIG. 4, in an implementation, a communication network 400 may be operating in a first mode, where the UE 110 may be configured with multiple TRPs (e.g., BSs, gNBs, eNBs, etc.). The multiple TRPs in the communication network 400 may be in the same serving cell, and/or in the same or different locations. The communication network 400 may include two or more BSs 105 with each having a coverage area 130. For example, the communication network 400 may include a first BS 105*a* having a first coverage area 130*a*, a second BS 105*b* having a second coverage area 130*b*, a third BS 105*c* having a third coverage area 130*c*, and a fourth BS 105*d* having a fourth coverage area 130*d*. The communication network 400 may include the UE 110. The first BS 105*a*, the second BS 105*b*, the third BS 105*c*, and the fourth BS 105*d* may be in a serving cell 402. The first BS 105*a*, the second BS 105*b*, the third BS 105*c*, and the fourth BS 105*d* may be in different locations. The first BS 105*a* may communicate with the UE 110 via first wireless links 120*a*, the second BS 105*b* may communicate with the UE 110 via second wireless links 120*b*, and so forth and so on. The first BS 105*a*, the second BS 105*b*, the third BS 105*c*, and the fourth BS 105*d* may have the following PCIs, respectively: PCI-1, PCI-2, PCI-3, PCI-4. The BSs 105*a-d* may transmit the corresponding PCIs to the UE 110 via one or more synchronization signal blocks.

During operation, in an implementation, a subset (i.e., some or all) of the first BS 105*a*, the second BS 105*b*, the third BS 105*c*, and the fourth BS 105*d* may serve the UE 110. The subset of TRPs may change rapidly. One or more TRPs (the first BS 105*a*, the second BS 105*b*, the third BS 105*c*, and/or the fourth BS 105*d*) may signal the UE 110 the subset of TRPs serving the UE 110 via a downlink control indicator (DCI) and/or a medium access control (MAC) control element (CE). In some examples, the second BS 105*b*, the third BS 105*c*, and the fourth BS 105*d* may be serving the UE 110.

In a first aspect, the PCI of any TRP in the cell 402 may be selected for PHY processings. For example, one or more PCIs of the first BS 105*a*, the second BS 105*b*, the third BS 105*c*, and/or the fourth BS 105*d* may be used as the default input cell identification (ID) for PHY processings, such as PCI-1. In some examples, PCI-1 may be used as the default input cell ID for bit scrambling, sequence determination, CCE-to-REG interleaving pattern determination, if no corresponding ID is configured. PCI-1 may be associated with an entire cell group. PCI-1 may or may not be a PCI for a particular cell in the cell group. PCI-1 may be signaled to the UE 110 by one or more of the second BS 105*b*, the third BS 105*c*, and the fourth BS 105*d* (serving TRPs), or implicitly determined by one or more rules as described below.

In alternative aspects, the PCI selected for PHY processings may be associated with an anchor cell (e.g. the serving cell 402) configured for broadcast, random access, receiving/analyzing measurement reports, or other control/management purposes.

In another aspect, the PCI selected for PHY processings may be the lowest one (e.g., PCI-1) or the highest one (e.g., PCI-4) in the group. Other rules may be used to determine the PCI for PHY processings.

In a second aspect, the PCI of any serving TRP in the cell 402 may be selected for PHY processings. For example, one or more PCIs of the second BS 105*b*, the third BS 105*c*, and/or the fourth BS 105*d* may be used as the default input cell identification (ID) for PHY processings, such as PCI-3. In some examples, PCI-3 may be used as the default input cell ID for bit scrambling, sequence determination, CCE-to-REG interleaving pattern determination, if no corresponding ID is configured. PCI-3 may be associated with an entire cell group. PCI-3 may or may not be a PCI for a particular cell in the cell group. PCI-3 may be signaled to the UE 110 by one or more of the second BS 105*b*, the third BS 105*c*, and the fourth BS 105*d* (serving TRPs), or implicitly determined by one or more rules.

In alternative aspects, the PCI selected for PHY processings may be the lowest one (e.g., PCI-2) or the highest one (e.g., PCI-4) in the group. Other rules may be used to determine the PCI for PHY processings.

In a third aspect, the PCI associated with the PHY processing may be used for the PHY processing. For example, if the third BS 105c transmits PDSCH information to the UE 110 or receives PUSCH information from the UE 110, PCI-3 may be used for the PHY processing (e.g., bit scrambling prior to modulation).

Examples of PHY processings may include the following. For PUSCH, PDSCH, PDCCH, and/or PUCCH format 2, 3, 4, bits prior to modulation may be scrambled by the PCI if no scrambling ID is configured. Time/frequency hopping pattern of sequence properties for sequence carrying information/DMRS in PUCCH format 0,1,3,4 may be determined by PCI if no corresponding determination ID is configured. Sequence properties may include sequence group, sequence number, and cyclic shift. When transform precoding is disabled or enabled, DMRS sequence for PUSCH, PDSCH, and/or PDCCH may be determined based on the PCI if no corresponding determination ID is configured. For interleaved CCE-to-REG mapping for a CORESET, the interleaving pattern may be a function of a parameter n_shift, which may be the PCI if no radio resource control (RRC) configured n_shift is provided. In one example, for CORESET 0 configured by ControlResourceSetZero information element, n_shift may be equal to the PCI. For PBCH, bits prior to modulation may be scrambled by the PCI, and DMRS may be determined by the PCI.

Figure 5:
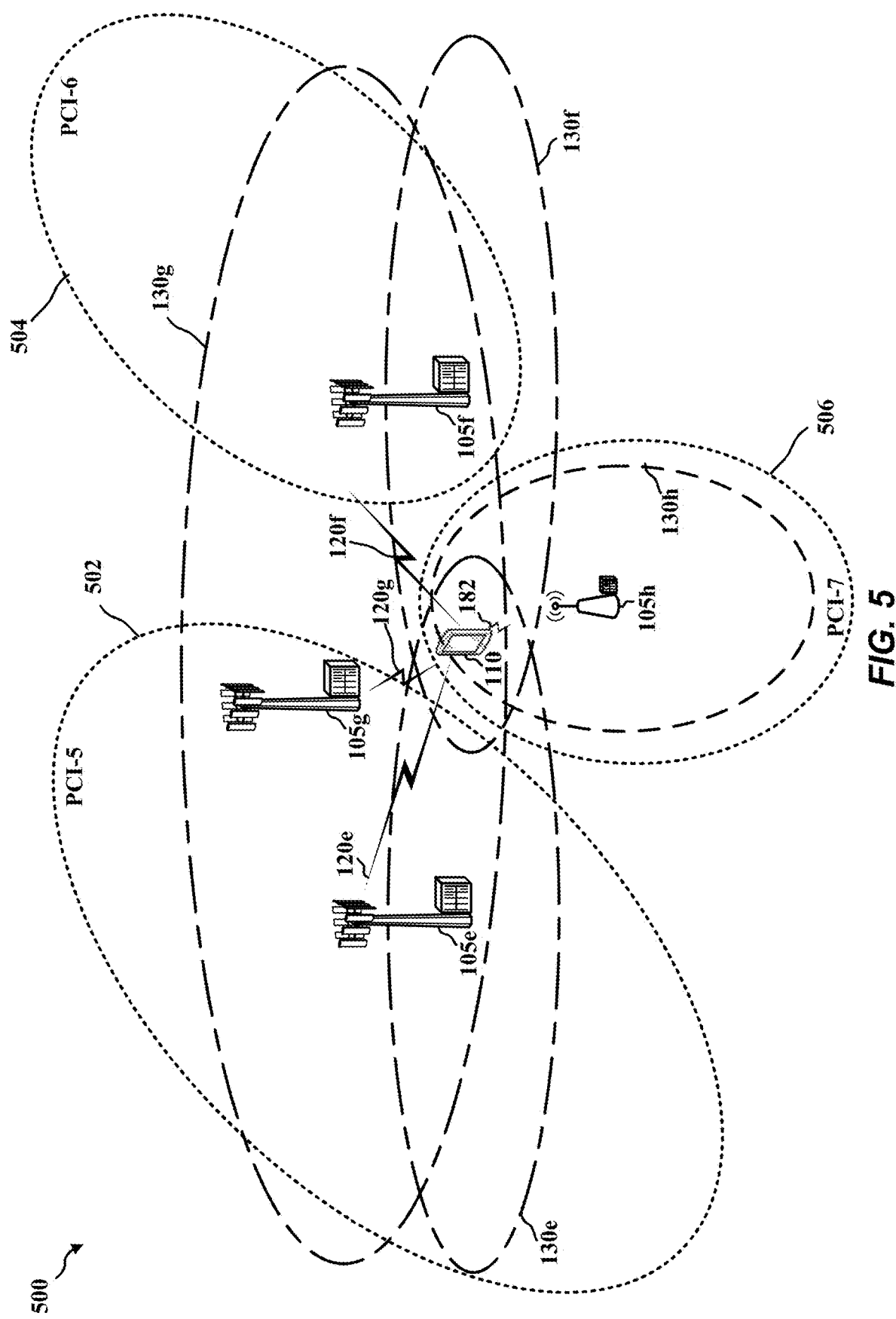
FIG. 5 is a schematic diagram of a second example of a wireless communication network having multiple cells for communicating with the UE according to aspects of the present disclosure.

Turning to FIG. 5, in an implementation, a communication network 500 may be operating in a second mode, where the UE 110 may be configured with multiple serving cells with a single PCI per serving cell. The communication network 500 may include a fifth BS 105e having a fifth coverage area 130e, a sixth BS 105f having a sixth coverage area 130f, a seventh BS 105g having a seventh coverage area 130h, and an eighth BS 105h having an eighth coverage area 130h. The communication network 500 may include the UE 110. The fifth BS 105e and the sixth BS 105f may be in a first cell 502, the seventh BS 105g may be in a second cell 504, and the eighth BS 105h may be in a third cell 506. The fifth BS 105e, the sixth BS 105f, the seventh BS 105g, and the eighth BS 105h may be in different locations. The fifth BS 105e may communicate with the UE 110 via first wireless links 120e, the sixth BS 105f may communicate with the UE 110 via second wireless links 120f, and so forth and so on. The fifth BS 105e, the sixth BS 105f, the seventh BS 105g, and the eighth BS 105h may have the following PCIs, respectively: PCI-5, PCI-5, PCI-6, PCI-7. The BSs 105e-h may transmit the corresponding PCIs to the UE 110 via one or more synchronization signal blocks.

During operation, in an implementation, a subset (i.e., some or all) of the first cell 502, the second cell 504, and the third cell 506 may serve the UE 110. The subset of serving cells may change rapidly. One or more serving cells of the first cell 502, the second cell 504, and the third cell 506 (e.g., TRPs within the serving cells) may signal the UE 110 the subset of serving cells serving the UE 110 via a downlink control indicator (DCI) and/or a medium access control (MAC) control element (CE). In some examples, first cell 502 and the third cell 506 may be serving the UE 110.

In a first aspect, the PCI of any cell in the network 500 may be selected for PHY processings. For example, one or more PCIs of the first cell 502, the second cell 504, and/or the third cell 506 may be used as the default input cell identification (ID) for PHY processings, such as PCI-6. In some examples, PCI-6 may be used as the default input cell ID for bit scrambling, sequence determination, CCE-to-REG interleaving pattern determination, if no corresponding ID is configured. PCI-6 may be associated with an entire cell group. PCI-6 may or may not be a PCI for a particular cell in the cell group. PCI-6 may be signaled to the UE 110 by one or more of the first cell 502 and/or the third cell 506 (serving cells, or serving TRPs), or implicitly determined by one or more rules.

In alternative aspects, the PCI selected for PHY processings may be associated with an anchor cell (e.g. the first cell 502) configured for broadcast, random access, receiving/analyzing measurement reports, or other control/management purposes.

In another aspect, the PCI selected for PHY processings may be the lowest one (e.g., PCI-5) or the highest one (e.g., PCI-7) in the group. Other rules may be used to determine the PCI for PHY processings.

In a second aspect, the PCI of any serving cell (e.g., the first cell 502 and/or the third cell 506) may be selected for PHY processings. For example, one or more PCIs of the first cell 502 and the third cell 506 may be used as the default input cell identification (ID) for PHY processings, such as PCI-7. In some examples, PCI-7 may be used as the default input cell ID for bit scrambling, sequence determination, CCE-to-REG interleaving pattern determination, if no corresponding ID is configured. PCI-7 may be associated with an entire cell group. PCI-7 may or may not be a PCI for a particular cell in the cell group. PCI-7 may be signaled to the UE 110 by one or more of the first cell 502 and/or the third cell 506 (serving cells, or serving TRPs), or implicitly determined by one or more rules.

In alternative aspects, the PCI selected for PHY processings may be the lowest one (e.g., PCI-5) or the highest one (e.g., PCI-7) in the group. Other rules may be used to determine the PCI for PHY processings.

In a third aspect, the PCI associated with the PHY processing may be used for the PHY processing. For example, if the first cell 502 transmits PDSCH information to the UE 110 or receives PUSCH information from the UE 110, PCI-5 may be used for the PHY processing (e.g., bit scrambling prior to modulation).

Examples of PHY processings may include the following. For PUSCH, PDSCH, PDCCH, and/or PUCCH format 2, 3, 4, bits prior to modulation may be scrambled by the PCI if no scrambling ID is configured. Time/frequency hopping pattern of sequence properties for sequence carrying information/DMRS in PUCCH format 0,1,3,4 may be determined by PCI if no corresponding determination ID is configured. Sequence properties may include sequence group, sequence number, and cyclic shift. When transform precoding is disabled or enabled, DMRS sequence for PUSCH, PDSCH, and/or PDCCH may be determined by PCI if no corresponding determination ID is configured. For interleaved control channel element (CCE) to resource element group (REG) mapping for a CORESET, the interleaving pattern may be a function of a parameter n_shift, which may be the PCI if no radio resource control (RRC) configured n_shift is provided. In one example, for CORESET 0 configured by ControlResourceSetZero information element, n_shift may be equal to the PCI. For PBCH, bits prior to modulation may be scrambled by the PCI, and DMRS may be determined by the PCI.

Figure 6:
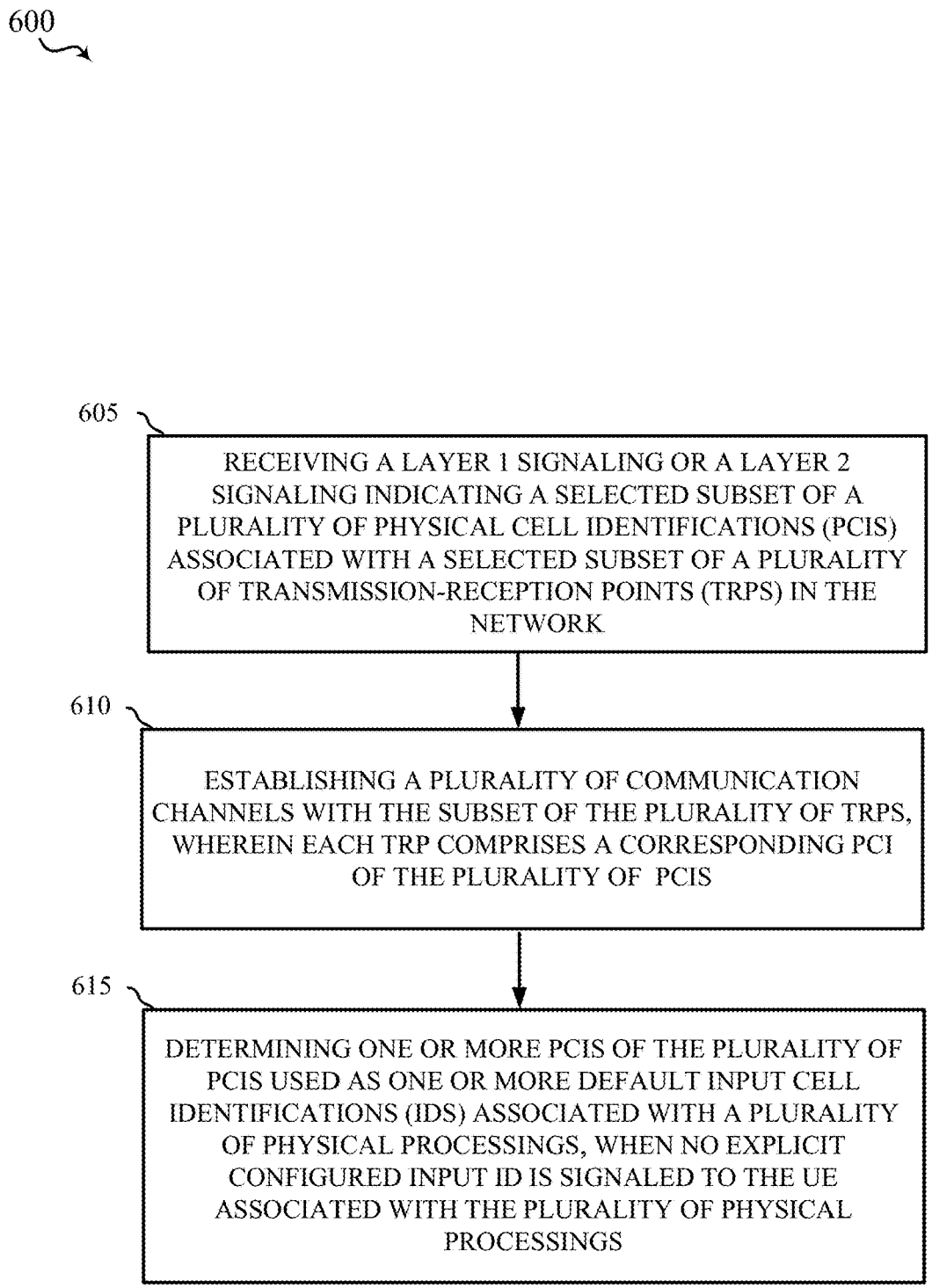
FIG. 6 is a process flow diagram of an example of a method for determining the PCI by a UE according to aspects of the present disclosure.

Referring to FIG. 6, an example of a method 600 for determining the PCI for PHY processings may be performed by the one or more of the processor 212, the memory 216, the applications 275, the modem 220, the transceiver 202 and/or the RF front end 288 and/or its subcomponents, the communication component 222, and/or the determination component 224 of the UE 110 in the wireless communication network 100.

At block 605, the method 600 may receive a layer 1 signaling or a layer 2 signaling indicating a selected subset of a plurality of physical cell identifications (PCIs) associated with a selected subset of a plurality of transmission-reception points (TRPs) in the network. For example, the communication component 222, the modem 220, and/or the processor 212 of the UE 110 may receive a layer 1 signaling or a layer 2 signaling, such as DCI and/or MAC-CE. The RF front end 288 may receive the electrical signals converted from electro-magnetic signals. The RF front end 288 may filter and/or amplify the electrical signals. The transceiver 302 or the receiver 306 may convert the electrical signals to the L1/L2 signaling, and send the L1/L2 signaling to the communication component 322.

In certain implementations, the processor 212, the modem 220, the communication component 222, the transceiver 202, the receiver 206, the transmitter 208, the RF front end 288, and/or the subcomponents of the RF front end 288 may be configured to and/or may define means for receiving a layer 1 signaling or a layer 2 signaling indicating a selected subset of a plurality of physical cell identifications (PCIs) associated with a selected subset of a plurality of transmission-reception points (TRPs) in the network.

At block 610, the method 600 may establish a plurality of communication channels with the subset of the plurality of TRPs, wherein each TRP comprises a corresponding PCI of the plurality of PCIs. For example, the communication component 222, the modem 220, and/or the processor 212 of the UE 110 may establish a plurality of communication channels with one or more of transmission-reception points (TRPs) as described above with respect to FIGS. 4 and 5.

In certain implementations, the processor 212, the modem 220, the communication component 222, the transceiver 202, the receiver 206, the transmitter 208, the RF front end 288, and/or the subcomponents of the RF front end 288 may be configured to and/or may define means for establishing a plurality of communication channels with the subset of the plurality of TRPs, wherein each TRP comprises a corresponding PCI of the plurality of PCIs.

At block 615, the method 600 may determine one or more PCIs of the plurality of PCIs used as one or more default input cell identifications (IDs) associated with a plurality of physical processings, when no explicit configured input ID is signaled to the UE associated with the plurality of physical processings. For example, the determination component 224, the modem 220, and/or the processor 212 of the UE 110 may determine one or more PCIs of the plurality of PCIs used as one or more default input cell identifications (IDs) as described above with respect to FIGS. 4 and 5.

In certain implementations, the processor 212, the modem 220, the determination component 224, the transceiver 202, the receiver 206, the transmitter 208, the RF front end 288, and/or the subcomponents of the RF front end 288 may be configured to and/or may define means for determining one or more PCIs of the plurality of PCIs used as one or more default input cell identifications (IDs) associated with a plurality of physical processings, when no explicit configured input ID is signaled to the UE associated with the plurality of physical processings.

Alternatively or additionally, the method 600 may further include any of the methods above, wherein at least one of the layer 1 signaling or the layer 2 signaling comprises a downlink control information (DCI) signaling or a medium access control (MAC)-control element (CE) signaling.

Alternatively or additionally, the method 600 may further include any of the methods above, further comprising scrambling a plurality of bits associated with uplink information using the one or more PCIs if no scrambling ID is configured and transmitting the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH).

Alternatively or additionally, the method 600 may further include any of the methods above, wherein transmitting the uplink information further comprises transmitting the uplink information via at least a timing or a frequency hopping pattern of a sequence property based on the one or more PCIs in at least one of PUCCH format 0, PUCCH format 1, the PUCCH format 3, or the PUCCH 4 if no determination ID is configured.

Alternatively or additionally, the method 600 may further include any of the methods above, wherein the sequence property comprises at least one of a sequence group, a sequence number, or a cyclic shift.

Alternatively or additionally, the method 600 may further include any of the methods above, further comprising receiving downlink information via at least one of the plurality of communication channels, wherein the plurality of communication channels comprises a physical broadcast channel and descrambling a plurality of bits associated with the downlink information using the one or more PCIs.

Alternatively or additionally, the method 600 may further include any of the methods above, further comprising receiving downlink information via at least one of the plurality of communication channels, wherein the plurality of communication channels comprises at least one of a physical downlink control channel or a physical downlink shared channel if no scrambling ID is configured and descrambling a plurality of bits associated with the downlink information using the one or more PCIs.

Alternatively or additionally, the method 600 may further include any of the methods above, wherein receiving the downlink information further comprises receiving the downlink information via resources indicated by a mapping in a control resource set (CORESET).

Alternatively or additionally, the method 600 may further include any of the methods above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Alternatively or additionally, the method 600 may further include any of the methods above, further comprising receiving one or more demodulation reference signals (DMRSs) for at least one of a physical downlink shared channel (PDSCH), a physical downlink control channel (PDDCH), or a physical broadcast channel (PBCH) from at least one of the plurality of TRPs, wherein the one or more DMRSs is generated based on the one or more PCIs if no corresponding determination ID is configured and demodulating the one or more DMRSs based on the one or more PCIs if no corresponding determination ID is configured.

Alternatively or additionally, the method 600 may further include any of the methods above, further comprising modulating the one or more demodulation reference signals (DMRSs) based on the one or more PCIs if no corresponding determination ID is configured and transmitting one or more DMRSs for a physical uplink shared channel (PUSCH) to at least one of the plurality of TRPs, wherein the one or more DMRSs is generated based on the one or more PCIs if no corresponding determination ID is configured.

Alternatively or additionally, the method 600 may further include any of the methods above, wherein the selected subset of the plurality of TRPs is associated with a serving cell and each TRP of the selected subset of the plurality of TRPs comprises a corresponding PCI.

Alternatively or additionally, the method 600 may further include any of the methods above, further comprising receiving corresponding synchronization signal blocks from each TRP of the selected subset of the plurality of TRPs indicating the corresponding PCI.

Alternatively or additionally, the method 600 may further include any of the methods above, further comprising receiving a downlink control information (DCI) signaling or a medium access control (MAC)-control element (CE) signaling indicating the selected subset of the plurality of TRPs.

Alternatively or additionally, the method 600 may further include any of the methods above, wherein the selected subset of the plurality of TRPs is associated with a subset of a plurality of serving cells and the subset of the plurality of PCIs is each associated with the subset of the plurality of serving cells.

Alternatively or additionally, the method 600 may further include any of the methods above, further comprising measuring L1 metrics for each of the subset of the plurality of serving cells.

Alternatively or additionally, the method 600 may further include any of the methods above, wherein the L1 metrics comprises at least one of reference signal receiving power, a signal to interference-noise ratio, or reference signal receiving quality.

Alternatively or additionally, the method 600 may further include any of the methods above, further comprising receiving a downlink control information (DCI) signaling or a medium access control (MAC)-control element (CE) signaling indicating the subset of the plurality of serving cells.

Alternatively or additionally, the method 600 may further include any of the methods above, wherein the one or more PCIs is associated with the selected subset of the plurality of TRPs of the network or a TRP different than the selected subset of the plurality of TRPs of the network.

Alternatively or additionally, the method 600 may further include any of the methods above, wherein determining the one or more PCIs further comprises identifying the one or more PCIs received from the BS or identifying the one or more PCIs based on one or more rules.

Alternatively or additionally, the method 600 may further include any of the methods above, wherein the one or more PCIs is associated with an anchor cell, an anchor TRP of the selected subset of the plurality of TRPs of the network, a lowest PCI of the plurality of PCIs, or a highest PCI of the plurality of PCIs.

Alternatively or additionally, the method 600 may further include any of the methods above, wherein the one or more PCIs is associated with the selected subset of the plurality of TRPs.

Alternatively or additionally, the method 600 may further include any of the methods above, wherein determining the one or more PCIs further comprises identifying the one or more PCIs received from the BS or identifying the one or more PCIs based on one or more rules.

Alternatively or additionally, the method 600 may further include any of the methods above, wherein the new PCI is associated with a lowest PCI of the plurality of PCIs or a highest PCI of the plurality of PCIs.

Alternatively or additionally, the method 600 may further include any of the methods above, wherein the one or more PCIs is a processing PCI associated with the plurality of physical processings of the one or more PCIs.

Referring to FIG. 7, an example of a method 700 for transmitting L1/L2 signaling may be performed by the one or more of the processor 312, the memory 316, the applications 375, the modem 320, the transceiver 302 and/or its subcomponents, the RF front end 388 and/or its subcomponents, and/or the communication component 322 of the BS 105 in the wireless communication network 100.

At block 705, the method 700 may transmit a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings. For example, the communication component 322, the modem 320, and/or the processor 312 of the BS 105 may transmit L1/L2 signaling, such as DCI and/or MAC-CE as described above with respect to FIGS. 4 and 5. The communication component 322 may send the L1/L2 signaling to the transceiver 302 or the transmitter 308. The transceiver 302 or the transmitter 308 may convert the L1/L2 signaling to electrical signals and send to the RF front end 388. The RF front end 388 may filter and/or amplify the electrical signals. The RF front end 388 may send the electrical signals as electromagnetic signals via the one or more antennas 365.

In certain implementations, the processor 312, the modem 320, the communication component 322, the transceiver 302, the receiver 306, the transmitter 308, the RF front end 388, and/or the subcomponents of the RF front end 388 may be configured to and/or may define means for transmitting a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings.

At block 710, the method 700 may establish a communication channel with the UE, wherein the communication channel is one of the plurality of communication channels between the UE and the selected subset of the plurality of TRPs, each TRP corresponding to a PCI of the plurality of PCIs. For example, the communication component 322, the modem 320, and/or the processor 312 of the BS 105 may establish a communication channel with the UE, wherein the communication channel is one of the plurality of communication channels between the UE and one or more transmission-reception points (TRPs), each TRP corresponding to a PCI of the plurality of PCIs.

In certain implementations, the processor 312, the modem 320, the communication component 322, the transceiver 302, the receiver 306, the transmitter 308, the RF front end 388, and/or the subcomponents of the RF front end 388 may be configured to and/or may define means for establishing a communication channel with the UE, wherein the communication channel is one of the plurality of communication channels between the UE and the selected subset of the plurality of TRPs, each TRP corresponding to a PCI of the plurality of PCIs.

Alternatively or additionally, the method 700 may further include any of the methods above, wherein at least one of the layer 1 signaling or the layer 2 signaling comprises a downlink control information (DCI) signaling or a medium access control (MAC)-control element (CE) signaling.

Alternatively or additionally, the method 700 may further include any of the methods above, further comprising receiving the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH) and descrambling a plurality of bits associated with uplink information using the one or more PCIs if no scrambling ID is configured.

Alternatively or additionally, the method 700 may further include any of the methods above, wherein receiving the uplink information further comprises receiving the uplink information transmitted via at least a timing or a frequency hopping pattern of a sequence property based on the one or more PCIs in at least one of PUCCH format 0, PUCCH format 1, the PUCCH format 3, or the PUCCH 4 if no determination ID is configured.

Alternatively or additionally, the method 700 may further include any of the methods above, wherein the sequence property comprises at least one of a sequence group, a sequence number, or a cyclic shift.

Alternatively or additionally, the method 700 may further include any of the methods above, further comprising descrambling a plurality of bits associated with downlink information using the one or more PCIs and transmitting the downlink information via at least one of the plurality of communication channels, wherein the plurality of communication channels comprises a physical broadcast channel.

Alternatively or additionally, the method 700 may further include any of the methods above, further comprising descrambling a plurality of bits associated with downlink information using the one or more PCIs and transmitting the downlink information via at least one of the plurality of communication channels, wherein the plurality of communication channels comprises at least one of a physical downlink control channel or a physical downlink shared channel if no scrambling ID is configured.

Alternatively or additionally, the method 700 may further include any of the methods above, further comprising transmitting a mapping in a control resource set (CORESET).

Alternatively or additionally, the method 700 may further include any of the methods above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Alternatively or additionally, the method 700 may further include any of the methods above, further comprising modulating the one or more demodulation reference signals (DMRSs) based on the one or more PCIs if no corresponding determination ID is configured and transmitting one or more DMRSs for at least one of a physical downlink shared channel (PDSCH), a physical downlink control channel (PDDCH), or a physical broadcast channel (PBCH) from at least one of the plurality of TRPs, wherein the one or more DMRSs is generated based on the one or more PCIs if no corresponding determination ID is configured.

Alternatively or additionally, the method 700 may further include any of the methods above, further comprising receiving one or more demodulation reference signals (DMRSs) for a physical uplink shared channel (PUSCH) to at least one of the plurality of TRPs, wherein the one or more DMRSs is generated based on the one or more PCIs if no corresponding determination ID is configured and demodulating the one or more DMRSs based on the one or more PCIs if no corresponding determination ID is configured.

Alternatively or additionally, the method 700 may further include any of the methods above, wherein the selected subset of the plurality of TRPs is associated with a serving cell and each TRP of the selected subset of the plurality of TRPs comprises a corresponding PCI.

Alternatively or additionally, the method 700 may further include any of the methods above, further comprising transmitting at least one of corresponding synchronization signal blocks from each TRP of the selected subset of the plurality of TRPs indicating the corresponding PCI Alternatively or additionally, the method 700 may further include any of the methods above, further comprising transmitting a downlink control information (DCI) signaling or a medium access control (MAC)-control element (CE) signaling indicating the selected subset of the plurality of TRPs.

Alternatively or additionally, the method 700 may further include any of the methods above, wherein the selected subset of the plurality of TRPs is associated with a subset of a plurality of serving cells and the subset of the plurality of PCIs is each associated with the subset of the plurality of serving cells.

Alternatively or additionally, the method 700 may further include any of the methods above, further comprising receiving measured L1 metrics from the UE for a serving cell of the plurality of the serving cells or each of the subset of the plurality of serving cells.

Alternatively or additionally, the method 700 may further include any of the methods above, wherein the L1 metrics comprises at least one of reference signal receiving power, a signal to interference-noise ratio, or reference signal receiving quality.

Alternatively or additionally, the method 700 may further include any of the methods above, further comprising transmitting a downlink control information (DCI) signaling or a medium access control (MAC)-control element (CE) signaling indicating the subset of the plurality of serving cells.

Alternatively or additionally, the method 700 may further include any of the methods above, further comprising determining the subset of the plurality of serving cells based on the received measured L1 metrics.

Alternatively or additionally, the method 700 may further include any of the methods above, wherein the one or more PCIs is associated with the selected subset of the plurality of TRPs of the network or a TRP different than the selected subset of the plurality of TRPs of the network.

Alternatively or additionally, the method 700 may further include any of the methods above, further comprising transmitting the one or more PCIs to the UE.

Alternatively or additionally, the method 700 may further include any of the methods above, wherein the one or more PCIs is associated with an anchor cell, an anchor TRP of the selected subset of the plurality of TRPs of the network, a lowest PCI of the plurality of PCIs, or a highest PCI of the plurality of PCIs.

Alternatively or additionally, the method 700 may further include any of the methods above, wherein the one or more PCIs is associated with the selected subset of the plurality of TRPs.

Alternatively or additionally, the method 700 may further include any of the methods above, further comprising transmitting one or more PCIs to the UE.

Alternatively or additionally, the method 700 may further include any of the methods above, wherein the new PCI is associated with a lowest PCI of the plurality of PCIs or a highest PCI of the plurality of PCIs.

Alternatively or additionally, the method 700 may further include any of the methods above, wherein the one or more PCIs is a processing PCI associated with the plurality of physical processings of the one or more PCIs.

Additional Implementations

Certain aspect of the present disclosure includes receiving a layer 1 signaling or a layer 2 signaling indicating a selected subset of a plurality of physical cell identifications (PCIs) associated with a selected subset of a plurality of transmission-reception points (TRPs) in the network, establishing a plurality of communication channels with the selected subset of the plurality of TRPs, wherein each TRP comprises a corresponding PCI of the plurality of PCIs, and determining one or more PCIs of the plurality of PCIs used as one or more default input cell identifications (IDs) associated with a plurality of physical processings, when no explicit configured input ID is signaled to the UE associated with the plurality of physical processings.

An aspect of the present disclosure includes the aspect above, wherein at least one of the layer 1 signaling or the layer 2 signaling comprises a downlink control information (DCI) signaling or a medium access control (MAC)-control element (CE) signaling.

Some aspects of the present disclosure includes any of the aspects above, further comprising scrambling a plurality of bits associated with uplink information using the one or more PCIs if no scrambling ID is configured, transmitting the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH).

Some aspects of the present disclosure includes any of the aspects above, wherein transmitting the uplink information further comprises transmitting the uplink information via at least a timing or a frequency hopping pattern of a sequence property based on the one or more PCIs in at least one of PUCCH format 0, PUCCH format 1, the PUCCH format 3, or the PUCCH format 4 if no determination ID is configured.

Some aspects of the present disclosure includes any of the aspects above, wherein the sequence property comprises at least one of a sequence group, a sequence number, or a cyclic shift.

Some aspects of the present disclosure includes any of the aspects above, further comprising receiving downlink information via at least one of the plurality of communication channels, wherein the plurality of communication channels comprises a physical broadcast channel and descrambling a plurality of bits associated with the downlink information using the one or more PCIs.

Some aspects of the present disclosure includes any of the aspects above, further comprising receiving downlink information via at least one of the plurality of communication channels, wherein the plurality of communication channels comprises at least one of a physical downlink control channel or a physical downlink shared channel if no scrambling ID is configured and descrambling a plurality of bits associated with the downlink information using the one or more PCIs.

Some aspects of the present disclosure includes any of the aspects above, wherein receiving the downlink information further comprises receiving the downlink information via resources indicated by a mapping in a control resource set (CORESET).

Some aspects of the present disclosure includes any of the aspects above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Some aspects of the present disclosure includes any of the aspects above, further comprising receiving one or more demodulation reference signals (DMRSs) for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured and demodulating the one or more DMRSs based on the one or more PCIs if no corresponding determination ID is configured.

Some aspects of the present disclosure includes any of the aspects above, further comprising receiving one or more demodulation reference signals (DMRSs) for a physical broadcast channel (PBCH) from at least one of the plurality of TRPs, wherein the one or more DMRSs is generated based on the one or more PCIs and demodulating the one or more DMRSs based on the one or more PCIs.

Some aspects of the present disclosure includes any of the aspects above, further comprising modulating one or more demodulation reference signals (DMRSs) based on the one or more PCIs if no corresponding determination ID is configured and transmitting one or more DMRSs for a physical uplink shared channel (PUSCH) to at least one of the plurality of TRPs, wherein the one or more DMRSs is generated based on the one or more PCIs if no corresponding determination ID is configured.

Some aspects of the present disclosure includes any of the aspects above, wherein the selected subset of the plurality of TRPs is associated with a serving cell and each TRP of the selected subset of the plurality of TRPs comprises a corresponding PCI.

Some aspects of the present disclosure includes any of the aspects above, further comprising receiving corresponding synchronization signal blocks from each TRP of the selected subset of the plurality of TRPs indicating the corresponding PCI.

Some aspects of the present disclosure includes any of the aspects above, further comprising receiving a downlink control information (DCI) signaling or a medium access control (MAC)-control element (CE) signaling indicating the selected subset of the plurality of TRPs.

Some aspects of the present disclosure includes any of the aspects above, wherein the selected subset of the plurality of TRPs is associated with a subset of a plurality of serving cells and the subset of the plurality of PCIs is each associated with the subset of the plurality of serving cells.

Some aspects of the present disclosure includes any of the aspects above, further comprising measuring L1 metrics for each of the subset of the plurality of serving cells.

Some aspects of the present disclosure includes any of the aspects above, wherein the L1 metrics comprises at least one of reference signal receiving power, a signal to interference-noise ratio, or reference signal receiving quality.

Some aspects of the present disclosure includes any of the aspects above, further comprising receiving a downlink control information (DCI) signaling or a medium access control (MAC)-control element (CE) signaling indicating the subset of the plurality of serving cells.

Some aspects of the present disclosure includes any of the aspects above, wherein the one or more PCIs is associated with the selected subset of the plurality of TRPs of the network or a TRP different than the selected subset of the plurality of TRPs of the network.

Some aspects of the present disclosure includes any of the aspects above, wherein determining the one or more PCIs further comprises identifying the one or more PCIs received from a base station or identifying the one or more PCIs based on one or more rules.

Some aspects of the present disclosure includes any of the aspects above, wherein the one or more PCIs is associated with an anchor cell, an anchor TRP of the selected subset of the plurality of TRPs of the network, a lowest PCI of the plurality of PCIs, or a highest PCI of the plurality of PCIs.

Some aspects of the present disclosure includes any of the aspects above, wherein the one or more PCIs is associated with the selected subset of the plurality of TRPs.

Some aspects of the present disclosure includes any of the aspects above, wherein determining the one or more PCIs further comprises identifying the one or more PCIs received from a base station or identifying the one or more PCIs based on one or more rules.

Some aspects of the present disclosure includes any of the aspects above, wherein a new PCI is associated with a lowest PCI of the plurality of PCIs or a highest PCI of the plurality of PCIs.

Some aspects of the present disclosure includes any of the aspects above, wherein the one or more PCIs is a processing PCI associated with the plurality of physical processings of the one or more PCIs.

Certain aspect of the present disclosure includes a user equipment having a memory comprising instructions, a transceiver, and one or more processors operatively coupled with the memory and the transceiver, the one or more processors configured to execute instructions in the memory to receive a layer 1 signaling or a layer 2 signaling indicating a selected subset of a plurality of physical cell identifications (PCIs) associated with a selected subset of a plurality of transmission-reception points (TRPs) in the network, establish a plurality of communication channels with the selected subset of the plurality of TRPs, wherein each TRP comprises a corresponding PCI of the plurality of PCIs, and determine one or more PCIs of the plurality of PCIs used as one or more default input cell identifications (IDs) associated with a plurality of physical processings, when no explicit configured input ID is signaled to the UE associated with the plurality of physical processings.

An aspect of the present disclosure includes the aspect above, wherein at least one of the layer 1 signaling or the layer 2 signaling comprises a downlink control information (DCI) signaling or a medium access control (MAC)-control element (CE) signaling.

Some aspects of the present disclosure includes any of the aspects above, wherein the one or more processors are further configured to scramble a plurality of bits associated with uplink information using the one or more PCIs if no scrambling ID is configured, transmit the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH).

Some aspects of the present disclosure includes any of the aspects above, wherein transmitting the uplink information further comprises transmitting the uplink information via at least a timing or a frequency hopping pattern of a sequence property based on the one or more PCIs in at least one of PUCCH format 0, PUCCH format 1, the PUCCH format 3, or the PUCCH format 4 if no determination ID is configured.

Some aspects of the present disclosure includes any of the aspects above, wherein the sequence property comprises at least one of a sequence group, a sequence number, or a cyclic shift.

Some aspects of the present disclosure includes any of the aspects above, wherein the one or more processors are further configured to receive downlink information via at least one of the plurality of communication channels, wherein the plurality of communication channels comprises a physical broadcast channel and descramble a plurality of bits associated with the downlink information using the one or more PCIs.

Some aspects of the present disclosure includes any of the aspects above, wherein the one or more processors are further configured to receive downlink information via at least one of the plurality of communication channels, wherein the plurality of communication channels comprises at least one of a physical downlink control channel or a physical downlink shared channel if no scrambling ID is configured and descramble a plurality of bits associated with the downlink information using the one or more PCIs.

Some aspects of the present disclosure includes any of the aspects above, wherein receiving the downlink information further comprises receiving the downlink information via resources indicated by a mapping in a control resource set (CORESET).

Some aspects of the present disclosure includes any of the aspects above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Some aspects of the present disclosure includes any of the aspects above, wherein the one or more processors are further configured to receive one or more demodulation reference signals (DMRSs) for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured and demodulate the one or more DMRSs based on the one or more PCIs if no corresponding determination ID is configured.

Some aspects of the present disclosure includes any of the aspects above, wherein the one or more processors are further configured to receive one or more demodulation reference signals (DMRSs) for a physical broadcast channel (PBCH) from at least one of the plurality of TRPs, wherein the one or more DMRSs is generated based on the one or more PCIs and demodulate the one or more DMRSs based on the one or more PCIs.

Some aspects of the present disclosure includes any of the aspects above, wherein the one or more processors are further configured to modulate one or more demodulation reference signals (DMRSs) based on the one or more PCIs if no corresponding determination ID is configured and transmit one or more DMRSs for a physical uplink shared channel (PUSCH) to at least one of the plurality of TRPs, wherein the one or more DMRSs is generated based on the one or more PCIs if no corresponding determination ID is configured.

Some aspects of the present disclosure includes any of the aspects above, wherein the selected subset of the plurality of TRPs is associated with a serving cell and each TRP of the selected subset of the plurality of TRPs comprises a corresponding PCI.

Some aspects of the present disclosure includes any of the aspects above, wherein the one or more processors are further configured to receiving corresponding synchronization signal blocks from each TRP of the selected subset of the plurality of TRPs indicating the corresponding PCI.

Some aspects of the present disclosure includes any of the aspects above, wherein the one or more processors are further configured to receive a downlink control information (DCI) signaling or a medium access control (MAC)-control element (CE) signaling indicating the selected subset of the plurality of TRPs.

Some aspects of the present disclosure includes any of the aspects above, wherein the selected subset of the plurality of TRPs is associated with a subset of a plurality of serving cells and the subset of the plurality of PCIs is each associated with the subset of the plurality of serving cells.

Some aspects of the present disclosure includes any of the aspects above, wherein the one or more processors are further configured to measure L1 metrics for each of the subset of the plurality of serving cells.

Some aspects of the present disclosure includes any of the aspects above, wherein the L1 metrics comprises at least one of reference signal receiving power, a signal to interference-noise ratio, or reference signal receiving quality.

Some aspects of the present disclosure includes any of the aspects above, wherein the one or more processors are further configured to receive a downlink control information (DCI) signaling or a medium access control (MAC)-control element (CE) signaling indicating the subset of the plurality of serving cells.

Some aspects of the present disclosure includes any of the aspects above, wherein the one or more PCIs is associated with the selected subset of the plurality of TRPs of the network or a TRP different than the selected subset of the plurality of TRPs of the network.

Some aspects of the present disclosure includes any of the aspects above, wherein determining the one or more PCIs further comprises identifying the one or more PCIs received from a base station or identifying the one or more PCIs based on one or more rules.

Some aspects of the present disclosure includes any of the aspects above, wherein the one or more PCIs is associated with an anchor cell, an anchor TRP of the selected subset of the plurality of TRPs of the network, a lowest PCI of the plurality of PCIs, or a highest PCI of the plurality of PCIs.

Some aspects of the present disclosure includes any of the aspects above, wherein the one or more PCIs is associated with the selected subset of the plurality of TRPs.

Some aspects of the present disclosure includes any of the aspects above, wherein determining the one or more PCIs further comprises identifying the one or more PCIs received from a base station or identifying the one or more PCIs based on one or more rules.

Some aspects of the present disclosure includes any of the aspects above, wherein a new PCI is associated with a lowest PCI of the plurality of PCIs or a highest PCI of the plurality of PCIs.

Some aspects of the present disclosure includes any of the aspects above, wherein the one or more PCIs is a processing PCI associated with the plurality of physical processings of the one or more PCIs.

Certain aspect of the present disclosure include a non-transitory computer readable medium having instructions stored therein that, when executed by one or more processors of a user equipment (UE), cause the one or more processors to receive a layer 1 signaling or a layer 2 signaling indicating a selected subset of a plurality of physical cell identifications (PCIs) associated with a selected subset of a plurality of transmission-reception points (TRPs) in the network, establish a plurality of communication channels with the selected subset of the plurality of TRPs, wherein each TRP comprises a corresponding PCI of the plurality of PCIs, and determine one or more PCIs of the plurality of PCIs used as one or more default input cell identifications (IDs) associated with a plurality of physical processings, when no explicit configured input ID is signaled to the UE associated with the plurality of physical processings.

An aspect of the present disclosure includes the aspect above, wherein at least one of the layer 1 signaling or the layer 2 signaling comprises a downlink control information (DCI) signaling or a medium access control (MAC)-control element (CE) signaling.

Some aspects of the present disclosure includes any of the aspects above, further comprising instructions for scrambling a plurality of bits associated with uplink information using the one or more PCIs if no scrambling ID is configured, transmitting the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH).

Some aspects of the present disclosure includes any of the aspects above, wherein the instructions for transmitting the uplink information further comprises instructions for transmitting the uplink information via at least a timing or a frequency hopping pattern of a sequence property based on the one or more PCIs in at least one of PUCCH format 0, PUCCH format 1, the PUCCH format 3, or the PUCCH format 4 if no determination ID is configured.

Some aspects of the present disclosure includes any of the aspects above, wherein the sequence property comprises at least one of a sequence group, a sequence number, or a cyclic shift.

Some aspects of the present disclosure includes any of the aspects above, further comprising instructions for receiving downlink information via at least one of the plurality of communication channels, wherein the plurality of communication channels comprises a physical broadcast channel and descrambling a plurality of bits associated with the downlink information using the one or more PCIs.

Some aspects of the present disclosure includes any of the aspects above, further comprising instructions for receiving downlink information via at least one of the plurality of communication channels, wherein the plurality of communication channels comprises at least one of a physical downlink control channel or a physical downlink shared channel if no scrambling ID is configured and descrambling a plurality of bits associated with the downlink information using the one or more PCIs.

Some aspects of the present disclosure includes any of the aspects above, wherein the instructions for receiving the downlink information further comprises instructions for receiving the downlink information via resources indicated by a mapping in a control resource set (CORESET).

Some aspects of the present disclosure includes any of the aspects above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Some aspects of the present disclosure includes any of the aspects above, further comprising instructions for receiving one or more demodulation reference signals (DMRSs) for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured and demodulating the one or more DMRSs based on the one or more PCIs if no corresponding determination ID is configured.

Some aspects of the present disclosure includes any of the aspects above, further comprising instructions for receiving one or more demodulation reference signals (DMRSs) for a physical broadcast channel (PBCH) from at least one of the plurality of TRPs, wherein the one or more DMRSs is generated based on the one or more PCIs and demodulating the one or more DMRSs based on the one or more PCIs.

Some aspects of the present disclosure includes any of the aspects above, further comprising instructions for modulating one or more demodulation reference signals (DMRSs) based on the one or more PCIs if no corresponding determination ID is configured and transmitting one or more DMRSs for a physical uplink shared channel (PUSCH) to at least one of the plurality of TRPs, wherein the one or more DMRSs is generated based on the one or more PCIs if no corresponding determination ID is configured.

Some aspects of the present disclosure includes any of the aspects above, wherein the selected subset of the plurality of TRPs is associated with a serving cell and each TRP of the selected subset of the plurality of TRPs comprises a corresponding PCI.

Some aspects of the present disclosure includes any of the aspects above, further comprising instructions for receiving corresponding synchronization signal blocks from each TRP of the selected subset of the plurality of TRPs indicating the corresponding PCI.

Some aspects of the present disclosure includes any of the aspects above, further comprising instructions for receiving a downlink control information (DCI) signaling or a medium access control (MAC)-control element (CE) signaling indicating the selected subset of the plurality of TRPs.

Some aspects of the present disclosure includes any of the aspects above, wherein the selected subset of the plurality of TRPs is associated with a subset of a plurality of serving cells and the subset of the plurality of PCIs is each associated with the subset of the plurality of serving cells.

Some aspects of the present disclosure includes any of the aspects above, further comprising instructions for measuring L1 metrics for each of the subset of the plurality of serving cells.

Some aspects of the present disclosure includes any of the aspects above, wherein the L1 metrics comprises at least one of reference signal receiving power, a signal to interference-noise ratio, or reference signal receiving quality.

Some aspects of the present disclosure includes any of the aspects above, further comprising instructions for receiving a downlink control information (DCI) signaling or a medium access control (MAC)-control element (CE) signaling indicating the subset of the plurality of serving cells.

Some aspects of the present disclosure includes any of the aspects above, wherein the one or more PCIs is associated with the selected subset of the plurality of TRPs of the network or a TRP different than the selected subset of the plurality of TRPs of the network.

Some aspects of the present disclosure includes any of the aspects above, wherein determining the one or more PCIs further comprises identifying the one or more PCIs received from a base station or identifying the one or more PCIs based on one or more rules.

Some aspects of the present disclosure includes any of the aspects above, wherein the one or more PCIs is associated with an anchor cell, an anchor TRP of the selected subset of the plurality of TRPs of the network, a lowest PCI of the plurality of PCIs, or a highest PCI of the plurality of PCIs.

Some aspects of the present disclosure includes any of the aspects above, wherein the one or more PCIs is associated with the selected subset of the plurality of TRPs.

Some aspects of the present disclosure includes any of the aspects above, wherein determining the one or more PCIs further comprises identifying the one or more PCIs received from a base station or identifying the one or more PCIs based on one or more rules.

Some aspects of the present disclosure includes any of the aspects above, wherein a new PCI is associated with a lowest PCI of the plurality of PCIs or a highest PCI of the plurality of PCIs.

Some aspects of the present disclosure includes any of the aspects above, wherein the one or more PCIs is a processing PCI associated with the plurality of physical processings of the one or more PCIs.

Certain aspect of the present disclosure includes means for receiving a layer 1 signaling or a layer 2 signaling indicating a selected subset of a plurality of physical cell identifications (PCIs) associated with a selected subset of a plurality of transmission-reception points (TRPs) in the network, means for establishing a plurality of communication channels with the selected subset of the plurality of TRPs, wherein each TRP comprises a corresponding PCI of the plurality of PCIs, and means for determining one or more PCIs of the plurality of PCIs used as one or more default input cell identifications (IDs) associated with a plurality of physical processings, when no explicit configured input ID is signaled to the UE associated with the plurality of physical processings.

An aspect of the present disclosure includes the aspect above, wherein at least one of the layer 1 signaling or the layer 2 signaling comprises a downlink control information (DCI) signaling or a medium access control (MAC)-control element (CE) signaling.

Some aspects of the present disclosure includes any of the aspects above, further comprising means for scrambling a plurality of bits associated with uplink information using the one or more PCIs if no scrambling ID is configured, means for transmitting the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH).

Some aspects of the present disclosure includes any of the aspects above, wherein means for transmitting the uplink information further comprises means for transmitting the uplink information via at least a timing or a frequency hopping pattern of a sequence property based on the one or more PCIs in at least one of PUCCH format 0, PUCCH format 1, the PUCCH format 3, or the PUCCH format 4 if no determination ID is configured.

Some aspects of the present disclosure includes any of the aspects above, wherein the sequence property comprises at least one of a sequence group, a sequence number, or a cyclic shift.

Some aspects of the present disclosure includes any of the aspects above, further comprising means for receiving downlink information via at least one of the plurality of communication channels, wherein the plurality of communication channels comprises a physical broadcast channel and means for descrambling a plurality of bits associated with the downlink information using the one or more PCIs.

Some aspects of the present disclosure includes any of the aspects above, further comprising means for receiving downlink information via at least one of the plurality of communication channels, wherein the plurality of communication channels comprises at least one of a physical downlink control channel or a physical downlink shared channel if no scrambling ID is configured and descrambling a plurality of bits associated with the downlink information using the one or more PCIs.

Some aspects of the present disclosure includes any of the aspects above, wherein means for receiving the downlink information further comprises means for receiving the downlink information via resources indicated by a mapping in a control resource set (CORESET).

Some aspects of the present disclosure includes any of the aspects above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Some aspects of the present disclosure includes any of the aspects above, further comprising means for receiving one or more demodulation reference signals (DMRSs) for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured and demodulating the one or more DMRSs based on the one or more PCIs if no corresponding determination ID is configured.

Some aspects of the present disclosure includes any of the aspects above, further comprising means for receiving one or more demodulation reference signals (DMRSs) for a physical broadcast channel (PBCH) from at least one of the plurality of TRPs, wherein the one or more DMRSs is generated based on the one or more PCIs and means for demodulating the one or more DMRSs based on the one or more PCIs.

Some aspects of the present disclosure includes any of the aspects above, further comprising means for modulating one or more demodulation reference signals (DMRSs) based on the one or more PCIs if no corresponding determination ID is configured and means for transmitting one or more DMRSs for a physical uplink shared channel (PUSCH) to at least one of the plurality of TRPs, wherein the one or more DMRSs is generated based on the one or more PCIs if no corresponding determination ID is configured.

Some aspects of the present disclosure includes any of the aspects above, wherein the selected subset of the plurality of TRPs is associated with a serving cell and each TRP of the selected subset of the plurality of TRPs comprises a corresponding PCI.

Some aspects of the present disclosure includes any of the aspects above, further comprising means for receiving corresponding synchronization signal blocks from each TRP of the selected subset of the plurality of TRPs indicating the corresponding PCI.

Some aspects of the present disclosure includes any of the aspects above, further comprising means for receiving a downlink control information (DCI) signaling or a medium access control (MAC)-control element (CE) signaling indicating the selected subset of the plurality of TRPs.

Some aspects of the present disclosure includes any of the aspects above, wherein the selected subset of the plurality of TRPs is associated with a subset of a plurality of serving cells and the subset of the plurality of PCIs is each associated with the subset of the plurality of serving cells.

Some aspects of the present disclosure includes any of the aspects above, further comprising means for measuring L1 metrics for each of the subset of the plurality of serving cells.

Some aspects of the present disclosure includes any of the aspects above, wherein the L1 metrics comprises at least one of reference signal receiving power, a signal to interference-noise ratio, or reference signal receiving quality.

Some aspects of the present disclosure includes any of the aspects above, further comprising means for receiving a downlink control information (DCI) signaling or a medium access control (MAC)-control element (CE) signaling indicating the subset of the plurality of serving cells.

Some aspects of the present disclosure includes any of the aspects above, wherein the one or more PCIs is associated with the selected subset of the plurality of TRPs of the network or a TRP different than the selected subset of the plurality of TRPs of the network.

Some aspects of the present disclosure includes any of the aspects above, wherein means for determining the one or more PCIs further comprises means for identifying the one or more PCIs received from a base station or identifying the one or more PCIs based on one or more rules.

Some aspects of the present disclosure includes any of the aspects above, wherein the one or more PCIs is associated with an anchor cell, an anchor TRP of the selected subset of the plurality of TRPs of the network, a lowest PCI of the plurality of PCIs, or a highest PCI of the plurality of PCIs.

Some aspects of the present disclosure includes any of the aspects above, wherein the one or more PCIs is associated with the selected subset of the plurality of TRPs.

Some aspects of the present disclosure includes any of the aspects above, wherein means for determining the one or more PCIs further comprises means for identifying the one or more PCIs received from a base station or identifying the one or more PCIs based on one or more rules.

Some aspects of the present disclosure includes any of the aspects above, wherein a new PCI is associated with a lowest PCI of the plurality of PCIs or a highest PCI of the plurality of PCIs.

Some aspects of the present disclosure includes any of the aspects above, wherein the one or more PCIs is a processing PCI associated with the plurality of physical processings of the one or more PCIs.

Certain aspects of the present disclosure includes transmitting a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings and establishing a communication channel with the UE, wherein the communication channel is one of the plurality of communication channels between the UE and the selected subset of the plurality of TRPs, each TRP corresponding to a PCI of the plurality of PCIs.

An aspect of the present disclosure includes the aspect above, wherein at least one of the layer 1 signaling or the layer 2 signaling comprises a downlink control information (DCI) signaling or a medium access control (MAC)-control element (CE) signaling.

Some aspects of the present disclosure includes any of the aspects above, further comprising receiving the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH) and descrambling a plurality of bits associated with uplink information using the one or more PCIs if no scrambling ID is configured.

Some aspects of the present disclosure includes any of the aspects above, wherein receiving the uplink information further comprises receiving the uplink information transmitted via at least a timing or a frequency hopping pattern of a sequence property based on the one or more PCIs in at least one of PUCCH format 0, PUCCH format 1, the PUCCH format 3, or the PUCCH 4 if no determination ID is configured.

Some aspects of the present disclosure includes any of the aspects above, wherein the sequence property comprises at least one of a sequence group, a sequence number, or a cyclic shift.

Some aspects of the present disclosure includes any of the aspects above, further comprising descrambling a plurality of bits associated with downlink information using the one or more PCIs and transmitting the downlink information via at least one of the plurality of communication channels, wherein the plurality of communication channels comprises a physical broadcast channel.

Some aspects of the present disclosure includes any of the aspects above, further comprising descrambling a plurality of bits associated with downlink information using the one or more PCIs and transmitting the downlink information via at least one of the plurality of communication channels, wherein the plurality of communication channels comprises at least one of a physical downlink control channel or a physical downlink shared channel if no scrambling ID is configured.

Some aspects of the present disclosure includes any of the aspects above, further comprising transmitting a mapping in a control resource set (CORESET).

Some aspects of the present disclosure includes any of the aspects above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Some aspects of the present disclosure includes any of the aspects above, further comprising modulating the one or more demodulation reference signals (DMRSs) based on the one or more PCIs if no corresponding determination ID is configured and transmitting one or more DMRSs for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured.

Some aspects of the present disclosure includes any of the aspects above, further comprising modulating the one or more demodulation reference signals (DMRSs) based on the one or more PCIs and transmitting one or more DMRSs for a physical broadcast channel (PBCH) from at least one of the plurality of TRPs, wherein the one or more DMRSs is generated based on the one or more PCIs.

Some aspects of the present disclosure includes any of the aspects above, further comprising receiving one or more demodulation reference signals (DMRSs) for a physical uplink shared channel (PUSCH) to at least one of the plurality of TRPs, wherein the one or more DMRSs is generated based on the one or more PCIs if no corresponding determination ID is configured and demodulating the one or more DMRSs based on the one or more PCIs if no corresponding determination ID is configured.

Some aspects of the present disclosure includes any of the aspects above, wherein the selected subset of the plurality of TRPs is associated with a serving cell and each TRP of the selected subset of the plurality of TRPs comprises a corresponding PCI.

Some aspects of the present disclosure includes any of the aspects above, further comprising transmitting at least one of corresponding synchronization signal blocks from each TRP of the selected subset of the plurality of TRPs indicating the corresponding PCI.

Some aspects of the present disclosure includes any of the aspects above, further comprising transmitting a downlink control information (DCI) signaling or a medium access control (MAC)-control element (CE) signaling indicating the selected subset of the plurality of TRPs.

Some aspects of the present disclosure includes any of the aspects above, wherein the selected subset of the plurality of TRPs is associated with a subset of a plurality of serving cells and the subset of the plurality of PCIs is each associated with the subset of the plurality of serving cells.

Some aspects of the present disclosure includes any of the aspects above, further comprising receiving measured L1 metrics from the UE for a serving cell of the plurality of the serving cells or each of the subset of the plurality of serving cells.

Some aspects of the present disclosure includes any of the aspects above, wherein the L1 metrics comprises at least one of reference signal receiving power, a signal to interference-noise ratio, or reference signal receiving quality.

Some aspects of the present disclosure includes any of the aspects above, further comprising transmitting a downlink control information (DCI) signaling or a medium access control (MAC)-control element (CE) signaling indicating the subset of the plurality of serving cells.

Some aspects of the present disclosure includes any of the aspects above, further comprising determining the subset of the plurality of serving cells based on the received measured L1 metrics.

Some aspects of the present disclosure includes any of the aspects above, wherein the one or more PCIs is associated with the selected subset of the plurality of TRPs of the network or a TRP different than the selected subset of the plurality of TRPs of the network.

Some aspects of the present disclosure includes any of the aspects above, further comprising transmitting the one or more PCIs to the UE.

Some aspects of the present disclosure includes any of the aspects above, wherein the one or more PCIs is associated with an anchor cell, an anchor TRP of the selected subset of the plurality of TRPs of the network, a lowest PCI of the plurality of PCIs, or a highest PCI of the plurality of PCIs.

Some aspects of the present disclosure includes any of the aspects above, wherein the one or more PCIs is associated with the selected subset of the plurality of TRPs.

Some aspects of the present disclosure includes any of the aspects above, further comprising transmitting one or more PCIs to the UE.

Some aspects of the present disclosure includes any of the aspects above, wherein the new PCI is associated with a lowest PCI of the plurality of PCIs or a highest PCI of the plurality of PCIs.

Some aspects of the present disclosure includes any of the aspects above, wherein the one or more PCIs is a processing PCI associated with the plurality of physical processings of the one or more PCIs.

Certain aspects of the present disclosure includes a base station having a memory comprising instructions, a transceiver, and one or more processors operatively coupled with the memory and the transceiver, the one or more processors configured to execute instructions in the memory to transmit a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings and establish a communication channel with the UE, wherein the communication channel is one of the plurality of communication channels between the UE and the selected subset of the plurality of TRPs, each TRP corresponding to a PCI of the plurality of PCIs.

An aspect of the present disclosure includes the aspect above, wherein at least one of the layer 1 signaling or the layer 2 signaling comprises a downlink control information (DCI) signaling or a medium access control (MAC)-control element (CE) signaling.

Some aspects of the present disclosure includes any of the aspects above, wherein the one or more processors are configured to receive the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH) and descramble a plurality of bits associated with uplink information using the one or more PCIs if no scrambling ID is configured.

Some aspects of the present disclosure includes any of the aspects above, wherein receiving the uplink information further comprises receiving the uplink information transmitted via at least a timing or a frequency hopping pattern of a sequence property based on the one or more PCIs in at least one of PUCCH format 0, PUCCH format 1, the PUCCH format 3, or the PUCCH 4 if no determination ID is configured.

Some aspects of the present disclosure includes any of the aspects above, wherein the sequence property comprises at least one of a sequence group, a sequence number, or a cyclic shift.

Some aspects of the present disclosure includes any of the aspects above, wherein the one or more processors are configured to descramble a plurality of bits associated with downlink information using the one or more PCIs and transmit the downlink information via at least one of the plurality of communication channels, wherein the plurality of communication channels comprises a physical broadcast channel.

Some aspects of the present disclosure includes any of the aspects above, wherein the one or more processors are configured to descramble a plurality of bits associated with downlink information using the one or more PCIs and transmit the downlink information via at least one of the plurality of communication channels, wherein the plurality of communication channels comprises at least one of a physical downlink control channel or a physical downlink shared channel if no scrambling ID is configured.

Some aspects of the present disclosure includes any of the aspects above, wherein the one or more processors are configured to transmit a mapping in a control resource set (CORESET).

Some aspects of the present disclosure includes any of the aspects above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Some aspects of the present disclosure includes any of the aspects above, wherein the one or more processors are configured to modulate the one or more demodulation reference signals (DMRSs) based on the one or more PCIs if no corresponding determination ID is configured and transmit one or more DMRSs for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured.

Some aspects of the present disclosure includes any of the aspects above, wherein the one or more processors are configured to modulate the one or more demodulation reference signals (DMRSs) based on the one or more PCIs and transmit one or more DMRSs for a physical broadcast channel (PBCH) from at least one of the plurality of TRPs, wherein the one or more DMRSs is generated based on the one or more PCIs.

Some aspects of the present disclosure includes any of the aspects above, wherein the one or more processors are configured to receive one or more demodulation reference signals (DMRSs) for a physical uplink shared channel (PUSCH) to at least one of the plurality of TRPs, wherein the one or more DMRSs is generated based on the one or more PCIs if no corresponding determination ID is configured and demodulate the one or more DMRSs based on the one or more PCIs if no corresponding determination ID is configured.

Some aspects of the present disclosure includes any of the aspects above, wherein the selected subset of the plurality of TRPs is associated with a serving cell and each TRP of the selected subset of the plurality of TRPs comprises a corresponding PCI.

Some aspects of the present disclosure includes any of the aspects above, wherein the one or more processors are configured to transmit at least one of corresponding synchronization signal blocks from each TRP of the selected subset of the plurality of TRPs indicating the corresponding PCI.

Some aspects of the present disclosure includes any of the aspects above, wherein the one or more processors are configured to transmit a downlink control information (DCI)

signaling or a medium access control (MAC)-control element (CE) signaling indicating the selected subset of the plurality of TRPs.

Some aspects of the present disclosure includes any of the aspects above, wherein the selected subset of the plurality of TRPs is associated with a subset of a plurality of serving cells and the subset of the plurality of PCIs is each associated with the subset of the plurality of serving cells.

Some aspects of the present disclosure includes any of the aspects above, wherein the one or more processors are configured to receive measured L1 metrics from the UE for a serving cell of the plurality of the serving cells or each of the subset of the plurality of serving cells.

Some aspects of the present disclosure includes any of the aspects above, wherein the L1 metrics comprises at least one of reference signal receiving power, a signal to interference-noise ratio, or reference signal receiving quality.

Some aspects of the present disclosure includes any of the aspects above, wherein the one or more processors are configured to transmit a downlink control information (DCI) signaling or a medium access control (MAC)-control element (CE) signaling indicating the subset of the plurality of serving cells.

Some aspects of the present disclosure includes any of the aspects above, wherein the one or more processors are configured to determine the subset of the plurality of serving cells based on the received measured L1 metrics.

Some aspects of the present disclosure includes any of the aspects above, wherein the one or more PCIs is associated with the selected subset of the plurality of TRPs of the network or a TRP different than the selected subset of the plurality of TRPs of the network.

Some aspects of the present disclosure includes any of the aspects above, wherein the one or more processors are configured to transmit the one or more PCIs to the UE.

Some aspects of the present disclosure includes any of the aspects above, wherein the one or more PCIs is associated with an anchor cell, an anchor TRP of the selected subset of the plurality of TRPs of the network, a lowest PCI of the plurality of PCIs, or a highest PCI of the plurality of PCIs.

Some aspects of the present disclosure includes any of the aspects above, wherein the one or more PCIs is associated with the selected subset of the plurality of TRPs.

Some aspects of the present disclosure includes any of the aspects above, wherein the one or more processors are configured to transmit one or more PCIs to the UE.

Some aspects of the present disclosure includes any of the aspects above, wherein the new PCI is associated with a lowest PCI of the plurality of PCIs or a highest PCI of the plurality of PCIs.

Some aspects of the present disclosure includes any of the aspects above, wherein the one or more PCIs is a processing PCI associated with the plurality of physical processings of the one or more PCIs.

Certain aspects of the present disclosure includes means for transmitting a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings and means for establishing a communication channel with the UE, wherein the communication channel is one of the plurality of communication channels between the UE and the selected subset of the plurality of TRPs, each TRP corresponding to a PCI of the plurality of PCIs.

An aspect of the present disclosure includes the aspect above, wherein at least one of the layer 1 signaling or the layer 2 signaling comprises a downlink control information (DCI) signaling or a medium access control (MAC)-control element (CE) signaling.

Some aspects of the present disclosure includes any of the aspects above, further comprising means for receiving the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH) and means for descrambling a plurality of bits associated with uplink information using the one or more PCIs if no scrambling ID is configured.

Some aspects of the present disclosure includes any of the aspects above, wherein means for receiving the uplink information further comprises means for receiving the uplink information transmitted via at least a timing or a frequency hopping pattern of a sequence property based on the one or more PCIs in at least one of PUCCH format 0, PUCCH format 1, the PUCCH format 3, or the PUCCH 4 if no determination ID is configured.

Some aspects of the present disclosure includes any of the aspects above, wherein the sequence property comprises at least one of a sequence group, a sequence number, or a cyclic shift.

Some aspects of the present disclosure includes any of the aspects above, further comprising means for descrambling a plurality of bits associated with downlink information using the one or more PCIs and means for transmitting the downlink information via at least one of the plurality of communication channels, wherein the plurality of communication channels comprises a physical broadcast channel.

Some aspects of the present disclosure includes any of the aspects above, further comprising means for descrambling a plurality of bits associated with downlink information using the one or more PCIs and means for transmitting the downlink information via at least one of the plurality of communication channels, wherein the plurality of communication channels comprises at least one of a physical downlink control channel or a physical downlink shared channel if no scrambling ID is configured.

Some aspects of the present disclosure includes any of the aspects above, further comprising means for transmitting a mapping in a control resource set (CORESET).

Some aspects of the present disclosure includes any of the aspects above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Some aspects of the present disclosure includes any of the aspects above, further comprising means for modulating the one or more demodulation reference signals (DMRSs) based on the one or more PCIs if no corresponding determination ID is configured and means for transmitting one or more DMRSs for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured.

Some aspects of the present disclosure includes any of the aspects above, further comprising means for modulating the one or more demodulation reference signals (DMRSs) based on the one or more PCIs and means for transmitting one or more DMRSs for a physical broadcast channel (PBCH) from at least one of the plurality of TRPs, wherein the one or more DMRSs is generated based on the one or more PCIs.

Some aspects of the present disclosure includes any of the aspects above, further comprising means for receiving one or more demodulation reference signals (DMRSs) for a physical uplink shared channel (PUSCH) to at least one of the plurality of TRPs, wherein the one or more DMRSs is generated based on the one or more PCIs if no corresponding determination ID is configured and means for demodulating the one or more DMRSs based on the one or more PCIs if no corresponding determination ID is configured.

Some aspects of the present disclosure includes any of the aspects above, wherein the selected subset of the plurality of TRPs is associated with a serving cell and each TRP of the selected subset of the plurality of TRPs comprises a corresponding PCI.

Some aspects of the present disclosure includes any of the aspects above, further comprising means for transmitting at least one of corresponding synchronization signal blocks from each TRP of the selected subset of the plurality of TRPs indicating the corresponding PCI.

Some aspects of the present disclosure includes any of the aspects above, further comprising means for transmitting a downlink control information (DCI) signaling or a medium access control (MAC)-control element (CE) signaling indicating the selected subset of the plurality of TRPs.

Some aspects of the present disclosure includes any of the aspects above, wherein the selected subset of the plurality of TRPs is associated with a subset of a plurality of serving cells and the subset of the plurality of PCIs is each associated with the subset of the plurality of serving cells.

Some aspects of the present disclosure includes any of the aspects above, further comprising means for receiving measured L1 metrics from the UE for a serving cell of the plurality of the serving cells or each of the subset of the plurality of serving cells.

Some aspects of the present disclosure includes any of the aspects above, wherein the L1 metrics comprises at least one of reference signal receiving power, a signal to interference-noise ratio, or reference signal receiving quality.

Some aspects of the present disclosure includes any of the aspects above, further comprising means for transmitting a downlink control information (DCI) signaling or a medium access control (MAC)-control element (CE) signaling indicating the subset of the plurality of serving cells.

Some aspects of the present disclosure includes any of the aspects above, further comprising means for determining the subset of the plurality of serving cells based on the received measured L1 metrics.

Some aspects of the present disclosure includes any of the aspects above, wherein the one or more PCIs is associated with the selected subset of the plurality of TRPs of the network or a TRP different than the selected subset of the plurality of TRPs of the network.

Some aspects of the present disclosure includes any of the aspects above, further comprising means for transmitting the one or more PCIs to the UE.

Some aspects of the present disclosure includes any of the aspects above, wherein the one or more PCIs is associated with an anchor cell, an anchor TRP of the selected subset of the plurality of TRPs of the network, a lowest PCI of the plurality of PCIs, or a highest PCI of the plurality of PCIs.

Some aspects of the present disclosure includes any of the aspects above, wherein the one or more PCIs is associated with the selected subset of the plurality of TRPs.

Some aspects of the present disclosure includes any of the aspects above, further comprising means for transmitting one or more PCIs to the UE.

Some aspects of the present disclosure includes any of the aspects above, wherein the new PCI is associated with a lowest PCI of the plurality of PCIs or a highest PCI of the plurality of PCIs.

Some aspects of the present disclosure includes any of the aspects above, wherein the one or more PCIs is a processing PCI associated with the plurality of physical processings of the one or more PCIs.

Certain aspects of the present disclosure includes a non-transitory computer readable medium having instructions to transmit a layer 1 signaling or a layer 2 signaling indicating a selected subset of a plurality of physical cell identifications (PCIs) associated with a selected subset of a plurality of transmission-reception points (TRPs) in the network, wherein one or more PCIs of the plurality of PCIs is configured for use by a user equipment (UE) as one or more default input cell identifications (IDs) associated with a plurality of physical processings, when no explicit configured input ID is signaled to the UE associated with the plurality of physical processings and establish a communication channel with the UE, wherein the communication channel is one of the plurality of communication channels between the UE and the selected subset of the plurality of TRPs, each TRP corresponding to a PCI of the plurality of PCIs.

An aspect of the present disclosure includes the aspect above, wherein at least one of the layer 1 signaling or the layer 2 signaling comprises a downlink control information (DCI) signaling or a medium access control (MAC)-control element (CE) signaling.

Some aspects of the present disclosure includes any of the aspects above, further comprising instructions to receive the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH) and descramble a plurality of bits associated with uplink information using the one or more PCIs if no scrambling ID is configured.

Some aspects of the present disclosure includes any of the aspects above, wherein receiving the uplink information further comprises receiving the uplink information transmitted via at least a timing or a frequency hopping pattern of a sequence property based on the one or more PCIs in at least one of PUCCH format 0, PUCCH format 1, the PUCCH format 3, or the PUCCH 4 if no determination ID is configured.

Some aspects of the present disclosure includes any of the aspects above, wherein the sequence property comprises at least one of a sequence group, a sequence number, or a cyclic shift.

Some aspects of the present disclosure includes any of the aspects above, further comprising instructions to descramble a plurality of bits associated with downlink information using the one or more PCIs and transmit the downlink information via at least one of the plurality of communication channels, wherein the plurality of communication channels comprises a physical broadcast channel.

Some aspects of the present disclosure includes any of the aspects above, further comprising instructions to descramble a plurality of bits associated with downlink information using the one or more PCIs and transmit the downlink information via at least one of the plurality of communication channels, wherein the plurality of communication channels comprises at least one of a physical downlink control channel or a physical downlink shared channel if no scrambling ID is configured.

Some aspects of the present disclosure includes any of the aspects above, further comprising instructions to transmit a mapping in a control resource set (CORESET).

Some aspects of the present disclosure includes any of the aspects above, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

Some aspects of the present disclosure includes any of the aspects above, further comprising instructions to modulate the one or more demodulation reference signals (DMRSs) based on the one or more PCIs if no corresponding determination ID is configured and transmit one or more DMRSs for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured.

Some aspects of the present disclosure includes any of the aspects above, further comprising instructions to modulate the one or more demodulation reference signals (DMRSs) based on the one or more PCIs and transmit one or more DMRSs for a physical broadcast channel (PBCH) from at least one of the plurality of TRPs, wherein the one or more DMRSs is generated based on the one or more PCIs.

Some aspects of the present disclosure includes any of the aspects above, further comprising instructions to receive one or more demodulation reference signals (DMRSs) for a physical uplink shared channel (PUSCH) to at least one of the plurality of TRPs, wherein the one or more DMRSs is generated based on the one or more PCIs if no corresponding determination ID is configured and demodulate the one or more DMRSs based on the one or more PCIs if no corresponding determination ID is configured.

Some aspects of the present disclosure includes any of the aspects above, wherein the selected subset of the plurality of TRPs is associated with a serving cell and each TRP of the selected subset of the plurality of TRPs comprises a corresponding PCI.

Some aspects of the present disclosure includes any of the aspects above, further comprising instructions to transmit at least one of corresponding synchronization signal blocks from each TRP of the selected subset of the plurality of TRPs indicating the corresponding PCI.

Some aspects of the present disclosure includes any of the aspects above, further comprising instructions to transmit a downlink control information (DCI) signaling or a medium access control (MAC)-control element (CE) signaling indicating the selected subset of the plurality of TRPs.

Some aspects of the present disclosure includes any of the aspects above, wherein the selected subset of the plurality of TRPs is associated with a subset of a plurality of serving cells and the subset of the plurality of PCIs is each associated with the subset of the plurality of serving cells.

Some aspects of the present disclosure includes any of the aspects above, further comprising instructions to receive measured L1 metrics from the UE for a serving cell of the plurality of the serving cells or each of the subset of the plurality of serving cells.

Some aspects of the present disclosure includes any of the aspects above, wherein the L1 metrics comprises at least one of reference signal receiving power, a signal to interference-noise ratio, or reference signal receiving quality.

Some aspects of the present disclosure includes any of the aspects above, further comprising instructions to transmit a downlink control information (DCI) signaling or a medium access control (MAC)-control element (CE) signaling indicating the subset of the plurality of serving cells.

Some aspects of the present disclosure includes any of the aspects above, further comprising instructions to determine the subset of the plurality of serving cells based on the received measured L1 metrics.

Some aspects of the present disclosure includes any of the aspects above, wherein the one or more PCIs is associated with the selected subset of the plurality of TRPs of the network or a TRP different than the selected subset of the plurality of TRPs of the network.

Some aspects of the present disclosure includes any of the aspects above, further comprising instructions to transmit the one or more PCIs to the UE.

Some aspects of the present disclosure includes any of the aspects above, wherein the one or more PCIs is associated with an anchor cell, an anchor TRP of the selected subset of the plurality of TRPs of the network, a lowest PCI of the plurality of PCIs, or a highest PCI of the plurality of PCIs.

Some aspects of the present disclosure includes any of the aspects above, wherein the one or more PCIs is associated with the selected subset of the plurality of TRPs.

Some aspects of the present disclosure includes any of the aspects above, further comprising instructions to transmit one or more PCIs to the UE.

Some aspects of the present disclosure includes any of the aspects above, wherein the new PCI is associated with a lowest PCI of the plurality of PCIs or a highest PCI of the plurality of PCIs.

Some aspects of the present disclosure includes any of the aspects above, wherein the one or more PCIs is a processing PCI associated with the plurality of physical processings of the one or more PCIs.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE) in a network, comprising:
   receiving a layer 1 signaling or a layer 2 signaling indicating a selected subset of a plurality of physical cell identifications (PCIs) associated with a selected subset of a plurality of transmission-reception points (TRPs) in the network;
   establishing a plurality of communication channels with the selected subset of the plurality of TRPs, wherein each TRP comprises a corresponding PCI of the plurality of PCIs; and
   determining one or more PCIs of the plurality of PCIs used as one or more default input cell identifications (IDs) associated with a plurality of physical processings, when no explicit configured input ID is signaled to the UE associated with the plurality of physical processings.

2. The method of claim 1, wherein at least one of the layer 1 signaling or the layer 2 signaling comprises a downlink control information (DCI) signaling or a medium access control (MAC)-control element (CE) signaling.

3. The method of claim 1, further comprising:
scrambling a plurality of bits associated with uplink information using the one or more PCIs if no scrambling ID is configured; and
transmitting the uplink information via at least one of the plurality of communication channels, wherein the plurality of communication channels comprises at least one of physical uplink control channel (PUCCH) format 2, PUCCH format 3, PUCCH format 4, or a physical uplink shared channel (PUSCH).

4. The method of claim 3, wherein transmitting the uplink information further comprises transmitting the uplink information via at least a timing or a frequency hopping pattern of a sequence property based on the one or more PCIs in at least one of PUCCH format 0, PUCCH format 1, the PUCCH format 3, or the PUCCH format 4 if no determination ID is configured.

5. The method of claim 4, wherein the sequence property comprises at least one of a sequence group, a sequence number, or a cyclic shift.

6. The method of claim 1, further comprising:
receiving downlink information via at least one of the plurality of communication channels, wherein the plurality of communication channels comprises a physical broadcast channel; and
descrambling a plurality of bits associated with the downlink information using the one or more PCIs.

7. The method of claim 1, further comprising:
receiving downlink information via at least one of the plurality of communication channels, wherein the plurality of communication channels comprises at least one of a physical downlink control channel or a physical downlink shared channel if no scrambling ID is configured; and
descrambling a plurality of bits associated with the downlink information using the one or more PCIs.

8. The method of claim 7, wherein receiving the downlink information further comprises receiving the downlink information via resources indicated by a mapping in a control resource set (CORESET).

9. The method of claim 8, wherein the mapping is a control channel element to resource element group mapping associated with the CORESET, wherein the mapping comprises an interleaving pattern that is a function of a parameter, wherein the parameter is the one or more PCIs if no radio resource control (RRC) configured parameter is provided.

10. The method of claim 1, further comprising:
receiving one or more demodulation reference signals (DMRSs) for at least one of a physical downlink shared channel (PDSCH) or a physical downlink control channel (PDDCH) from at least one of the plurality of TRPs, wherein the one or more DMRSs is generated based on the one or more PCIs if no corresponding determination ID is configured; and
demodulating the one or more DMRSs based on the one or more PCIs if no corresponding determination ID is configured.

11. The method of claim 1, further comprising:
receiving one or more demodulation reference signals (DMRSs) for a physical broadcast channel (PBCH) from at least one of the plurality of TRPs, wherein the one or more DMRSs is generated based on the one or more PCIs; and
demodulating the one or more DMRSs based on the one or more PCIs.

12. The method of claim 1, further comprising:
modulating one or more demodulation reference signals (DMRSs) based on the one or more PCIs if no corresponding determination ID is configured; and
transmitting one or more DMRSs for a physical uplink shared channel (PUSCH) to at least one of the plurality of TRPs, wherein the one or more DMRSs is generated based on the one or more PCIs if no corresponding determination ID is configured.

13. The method of claim 1, wherein:
the selected subset of the plurality of TRPs is associated with a serving cell; and
each TRP of the selected subset of the plurality of TRPs comprises a corresponding PCI.

14. The method of claim 13, further comprising receiving corresponding synchronization signal blocks from each TRP of the selected subset of the plurality of TRPs indicating the corresponding PCI.

15. The method of claim 14, further comprising receiving a downlink control information (DCI) signaling or a medium access control (MAC)-control element (CE) signaling indicating the selected subset of the plurality of TRPs.

16. The method of claim 1, wherein:
the selected subset of the plurality of TRPs is associated with a subset of a plurality of serving cells; and
the subset of the plurality of PCIs is each associated with the subset of the plurality of serving cells.

17. The method of claim 16, further comprising measuring L1 metrics for each of the subset of the plurality of serving cells.

18. The method of claim 17, wherein the L1 metrics comprises at least one of reference signal receiving power, a signal to interference-noise ratio, or reference signal receiving quality.

19. The method of claim 18, wherein determining the one or more PCIs further comprises identifying the one or more PCIs received from a base station or identifying the one or more PCIs based on one or more rules.

20. The method of claim 17, further comprising receiving a downlink control information (DCI) signaling or a medium access control (MAC)-control element (CE) signaling indicating the subset of the plurality of serving cells.

21. The method of claim 1, wherein the one or more PCIs is associated with the selected subset of the plurality of TRPs of the network or a TRP different than the selected subset of the plurality of TRPs of the network.

22. The method of claim 21, wherein the one or more PCIs is associated with an anchor cell, an anchor TRP of the selected subset of the plurality of TRPs of the network, a lowest PCI of the plurality of PCIs, or a highest PCI of the plurality of PCIs.

23. The method of claim 1, wherein the one or more PCIs is associated with the selected subset of the plurality of TRPs.

24. The method of claim 23, wherein determining the one or more PCIs further comprises identifying the one or more PCIs received from a base station or identifying the one or more PCIs based on one or more rules.

25. The method of claim 23, wherein a new PCI is associated with a lowest PCI of the plurality of PCIs or a highest PCI of the plurality of PCIs.

26. The method of claim 1, wherein the one or more PCIs is a processing PCI associated with the plurality of physical processings of the one or more PCIs.

27. A user equipment (UE), comprising:
a memory comprising instructions;
a transceiver; and
one or more processors operatively coupled with the memory and the transceiver, the one or more processors configured to execute instructions in the memory to:
  receive, via the transceiver, a layer 1 signaling or a layer 2 signaling indicating a selected subset of a plurality of physical cell identifications (PCIs) associated with a selected subset of a plurality of transmission-reception points (TRPs) in the network;
  establish, via the transceiver, a plurality of communication channels with the selected subset of the plurality of TRPs, wherein each TRP comprises a corresponding PCI of the plurality of PCIs; and
  determine one or more PCIs of the plurality of PCIs used as one or more default input cell identifications (IDs) associated with a plurality of physical processings, when no explicit configured input ID is signaled to the UE associated with the plurality of physical processings.

28. A non-transitory computer readable medium having instructions stored therein that, when executed by one or more processors of a user equipment (UE), cause the one or more processors to:
receive a layer 1 signaling or a layer 2 signaling indicating a selected subset of a plurality of physical cell identifications (PCIs) associated with a selected subset of a plurality of transmission-reception points (TRPs) in the network;
establish a plurality of communication channels with the selected subset of the plurality of TRPs, wherein each TRP comprises a corresponding PCI of the plurality of PCIs; and
determine one or more PCIs of the plurality of PCIs used as one or more default input cell identifications (IDs) associated with a plurality of physical processings, when no explicit configured input ID is signaled to the UE associated with the plurality of physical processings.

29. A user equipment (UE), comprising:
means for receiving a layer 1 signaling or a layer 2 signaling indicating a selected subset of a plurality of physical cell identifications (PCIs) associated with a selected subset of a plurality of transmission-reception points (TRPs) in the network;
means for establishing a plurality of communication channels with the selected subset of the plurality of TRPs, wherein each TRP comprises a corresponding PCI of the plurality of PCIs; and
means for determining one or more PCIs of the plurality of PCIs used as one or more default input cell identifications (IDs) associated with a plurality of physical processings, when no explicit configured input ID is signaled to the UE associated with the plurality of physical processings.

* * * * *